(12) United States Patent
Bernstein

(10) Patent No.: US 12,547,248 B1
(45) Date of Patent: Feb. 10, 2026

(54) MICRO-ELECTRO-MECHANICAL SYSTEMS (MEMS) TACTILE DISPLAY

(71) Applicant: The Charles Stark Draper Laboratory, Inc., Cambridge, MA (US)

(72) Inventor: Jonathan J. Bernstein, Medfield, MA (US)

(73) Assignee: The Charles Stark Draper Laboratory, Inc., Cambridge, MA (US)

(*) Notice: Subject to any disclaimer, the term of this patent is extended or adjusted under 35 U.S.C. 154(b) by 1207 days.

(21) Appl. No.: 17/358,881

(22) Filed: Jun. 25, 2021

Related U.S. Application Data

(60) Provisional application No. 63/043,939, filed on Jun. 25, 2020.

(51) Int. Cl.
| | |
|---|---|
| *G06F 3/01* | (2006.01) |
| *G01S 17/89* | (2020.01) |
| *G06T 5/73* | (2024.01) |
| *G09B 21/00* | (2006.01) |
| *H04N 23/00* | (2023.01) |

(52) U.S. Cl.
CPC .............. *G06F 3/016* (2013.01); *G01S 17/89* (2013.01); *G06T 5/73* (2024.01); *G09B 21/004* (2013.01); *H04N 23/00* (2023.01)

(58) Field of Classification Search
CPC .......... G06F 3/016; G01S 17/89; G06T 5/73; G09B 21/004; H04N 23/00
See application file for complete search history.

(56) References Cited

U.S. PATENT DOCUMENTS

| | | |
|---|---|---|
| 3,229,387 A | 1/1966 | Linvill |
| 3,755,766 A | 8/1973 | Read, Jr. |
| 4,881,900 A | 11/1989 | Matsuoka et al. |
| 8,008,835 B2 * | 8/2011 | Degertekin ........... B06B 1/0292 310/309 |

(Continued)

FOREIGN PATENT DOCUMENTS

WO    WO 2011/107982 A1    9/2011

OTHER PUBLICATIONS

Nikhil Apte, Kwan Kyu Park, Butrus T. Khuri-Yakub; Experimental evaluation of CMUTs with vented cavities under varying pressure; IEEE; Jan. 30, 2014; 2013 IEEE International Ultrasonics Symposium (IUS) (Year: 2013).*

(Continued)

*Primary Examiner* — Kang Hu
*Assistant Examiner* — Anthony James Bulthuis
(74) *Attorney, Agent, or Firm* — Brooks Kushman, P.C.

(57) ABSTRACT

A tactile human-user interface system provides a refreshable tactile display that communicates text and images. The system includes a processor and a set of transducers. The processor receives text and/or image input and defeatures any images in the input to produce a simplified image. The processor translates the input into tactile form, which it converts into a set of electrical signals associated with a set of pixels of a display. Each transducer of the set of transducers corresponds to a respective pixel of the set of pixels. The set of transducers receive, from the processor, the set of electrical signals. The set of transducers generates, in response to the set of electrical signals, tactile outputs, detectable by a finger of a human user, at locations corresponding to the set of pixels.

27 Claims, 31 Drawing Sheets

(56) References Cited

U.S. PATENT DOCUMENTS

| | | | |
|---|---|---|---|
| 8,207,945 B2 | 6/2012 | De Jong et al. | |
| 8,441,463 B2 | 5/2013 | Harrison | |
| 9,711,065 B2 | 7/2017 | Yu et al. | |
| 10,613,678 B1* | 4/2020 | Sen ..................... | G06F 3/0412 |
| 2002/0158836 A1 | 10/2002 | Ishmael, Jr. et al. | |
| 2006/0066428 A1* | 3/2006 | McCarthy ............ | H01F 7/0252 |
| | | | 335/207 |
| 2011/0199342 A1* | 8/2011 | Vartanian ............ | G06F 3/04845 |
| | | | 715/702 |
| 2015/0363365 A1* | 12/2015 | Campbell .............. | G06F 3/016 |
| | | | 345/173 |
| 2016/0202761 A1* | 7/2016 | Bostick ................ | G09B 21/004 |
| | | | 345/173 |
| 2018/0342176 A1* | 11/2018 | Californiaa ............ | G09B 21/04 |
| 2020/0142485 A1* | 5/2020 | Ma .......................... | B32B 5/026 |
| 2020/0143791 A1* | 5/2020 | Halbach ................ | B06B 1/0629 |
| 2020/0235213 A1 | 7/2020 | Gelinck et al. | |

OTHER PUBLICATIONS

Mengli Wang, Jingkuang Chen, Xiaoyang Cheng, Chuan Li, Xueyuan Liu; Fabrication and characterization of surface micromachined CMUT with a bossed membrane; IEEE; Mar. 21, 2009; 2008 IEEE Ultrasonics Symposium (Year: 2008).*

Screen captures from YouTube video clip entitled "DIY Ultrasonic Audio Laser (Directional Speaker)" 2 images, uploaded on Apr. 4, 2020 by user "Mean Gene Hacks". Retrieved from Internet: <https://www.youtube.com/watch?v=9hD5FPVSsV0> (Year: 2020).*

Au, A., et al., "Microvalves and Micropumps for BioMEMs," *Micromachines*, vol. 2, pp. 179-220, 2011.

Bar-Cohen, Y., "Electroactive Polymers for Refreshable Braille Displays," *SPIE*, 5 pages, Sep. 11, 2009.

Bar-Cohen, Y., Refreshable Braille Displays Using EAP Actuators, *Proceedings of SPIE*, vol. 7642, 6 pages, 2019.

Benali-Khoudja, M., et al., "Tactile Interfaces: A State-of-the-Art Survey," *Atomic Energy and Alternative Energies Commission*, 9 pages, Jan. 2004.

Benali-Khoudja, M., et al., "VITAL: An Electromagnetic Integrated Tactile Display," *DISPLAYS*, vol. 28, pp. 133-144, 2007.

Blackmore, J, et al., "Ultrasound Neuromodulation: A Review of Results, Mechanisms and Safety," *Ultrasound in Med. & Biol.*, vol. 45, No. 7, pp. 1509-1536, 2019

Chow, et al., "High Voltage Thin Film Transistors Integrated with MEMS," 13th International Conference on Solid-State Sensors, Actuators and Microsystems, Seoul, Korea, 4 pages, Jun. 5-9, 2005.

Cristaldi, D. et al., "Liquid Crystal Display Drivers, Techniques and Circuits," *Springer Science+Business Media B. V.*, 303 pages, 2009.

Dalecki, D., et al., "Tactile Perception of Ultrasound," *The Journal of the Acoustical Society of America*, No. 97, pp. 3165-3170, May 1995

Debus, T., et al., "Multi-Channel Vibrotactile Display for Teleoperated Assembly," *Proceedings of the 2002 IEEE*, pp. 592-597, May 2002.

Deng, K., et al., "Design and Development of a Pulsed Electromagnetic Micro-actuator for 3D Virtual Tactile Displays," *Mechatronics*, No. 20, pp. 503-509, 2010.

Desnoyers, C, et al., "Ultrasonic Haptic Feedback," 6.101 Final Project, MIT, Spring 2017, 15 pages.

Forta, N., et al., "Vibrotactile Difference Thresholds: Effects of Vibration Frequency, Vibration Magnitude, Contact Area, and Body Location," *Somatosensory & Motor Research*, vol. 29, No. 1, pp. 28-37, Mar. 2012.

Gerardo, C., et al., "Fabrication and Testing of Polymer-Based Capacitive Micromachined Ultrasound Transducers for Medical Imaging," *Microsystems & Nanoengineering*, 12 pages, 2018.

Gordon, Roy G., "Criteria for Choosing Transplant Conductors," *MRS Bulletin*, pp. 52-57, Aug. 2000.

Griffin, Michael J., "Frequency-Dependence of Psychophysieal and Physiological Responses to Hand-Transmitted Vibration," *Industrial Health*, No. 50, pp. 354-369, 2012.

Hale, K., et al., "Deriving Haptic Design Guidelines From Human Physiological, Psychophysical, and Neurological Foundations," *IEEE Computer Graphics and Applications*, pp. 33-39, 2004.

Hauger, J., et al., "Reading Machines for the Blind—A Study of Federally Supported Technology Development and Innovation," Dissertations and Theses 1995—Chapter 9. Stanford, Telesensory Systems, and the Optacon, pp. 180-226.

Hong, WC, et al., "MgZnO High Voltage Thin Film Transistors on Glass for Inverters in Building Integrated Photovoltaics," *Scientific Reports*, vol. 6, 9 pages, 2016.

Hoshi, T., et al., "Non-Contact Tactile Sensation Synthesized by Ultrasound Transducers," *IEEE*, pp. 256-260, 2009.

Kanda, K., et al., "Tactile Device Based on Piezoelectiic MEMS by Using a Polymer/PZT Laminated Structure," *IEEE Transactions on Sensors and Micromachines*, vol. 137, No. 9, pp. 284-289, 2017.

Karastoyanov, D., et al., "Electromagnetic Linear Microdrive for Braille Screen: Control and Circuit Test," *International Journal of Materials Science and Engineering*, vol. 3, No. 1, pp. 1-6, Mar. 2015.

Komurasaki, S., et al., "Fundamental Perceptual Characterization of an Integrated Tactile Display with Electrovibration and Electrical Stimuli," *Micromachines*, vol. 10, No. 301, 12 pages, 2019.

Lee, H, et al., "High Temperature, High Power Piezoelectric Composite Transducers," *Sensors*, vol. 14, pp. 14526-14552, 2014.

Lee, J., et al., "Introduction to Flat Panel Displays," 2nd edn., Wiley SID series in display technology, 6 pages, Sep. 2020.

Lee, W., et al., "Creation of Various Skin Sensations Using Pulsed Focused Ultrasound: Evidence for Functional Neuromodulation," *Wiley Periodicals, Inc.*, 8 pages, 2014.

Levard, T., et al., "Core-Free Rolled Actuators for Braille Displays Using P(VDF-TrFE-CFE)," *Smart Mater. Struct.*, No. 21, 8 pages, 2012.

Linvill, J.G., "A Direct Translation Reading Aid for the Blind," *Proceedings of the IEEE*, vol. 54, No. 1, 54 pages, Jan. 1966.

Marette, A., et al., "Yttrium zinc tin oxide high voltage thin film transistors," *Appl. Phys. Lett.*, vol. 113, 6 pages, 2018.

Masuyama, S, et al., "A Novel Electromagnetic Linear Actuator with Inner and Outer Stators and One Moving Winding for Tactile Dismay," *IEEE*, pp. 628-633, 2016.

Morioka, M., et al., "Thresholds for the Perception of Hand-Transmitted Vibration: Dependence on Contact Area and Contact Location," *Somatosensory & Motor Research*, vol. 22, No. 4, pp. 281-297, Dec. 2005.

O'Modhrain, S., et al., "Designing Media for Visually-Impaired Users of Refreshable Touch Displays: Possibilities and Pitfalls," *IEEE Transactions on Haptics*, vol. 8, No. 3, pp. 248-257, Jul.-Sep. 2015.

Pang, D., et al., "Development of a Novel Transplant Flexible Capacitive Micromachined Ultrasonic Transducer," *Sensors*, vol. 17, 16 pages, 2017.

Pece, F et al., "MagTics: Flexible and Thin Form Factor Magnetic Actuators for Dynamic and Wearable Haptic Feedback," *UIST*, pp. 143-154, Oct. 2017.

Rantala, J., "Spatial Touch in Presenting Information with Mobile Devices," *Dissertations in Interactive Technology*, No. 19, 155 pages, Nov. 13, 2014.

Rantala, J., "The Tactile Senses & Haptic Perception," *TAUCHI*, University of Tampere, Finland, https://pdf4pro.com/view/the-taetile-senses-amp-haptic-perception-university-of-tampere-5a4bcf.html, 41 pages, no date.

Rantala, J., "Tactile Feedback Technology & Applications," *TAUCHI*, University of Tampere, Finland, 49 pages, 2018.

Raza, M., et al., "A Tactile Palette to Translate Graphics for the Visually Impaired," Disney Research & National Braille Press; 6 pages, 2017.

Ren, Z, et al., "A New Bistable Electroactive Polymer for Prolonged Cycle Lifetime of Refreshable Braille Displays," *Proc. of SPIE*, vol. 9056, 10 pages, 2014.

Runyan, N., "EAP Braille Display Needs and Requirements," *National Braille Press*. 3 pages, Jun. 2018.

(56) References Cited

OTHER PUBLICATIONS

Runyan, N., et al., "EAP Actuators Aid the Quest for the 'Holy Braille" of Tactile Displays,"*Proc. of SPIE*, vol. 7642, 12 pages, 2010.

Russomanno, A., et al., "Modeling Pneumatic Actuators for a Refreshable Tactile Display," *Conference: International Conference on Human Haptic Sensing and Touch Enabled Computer Applications*, 8 pages, Jun. 2014.

Russomanno, et al., "Sample Records for Refreshable Braille Displays," *ScienceGov—Your Gateway to U.S. Federal Science*, 195 pages, Jan. 1, 2015.

Salim, M., et al., "Capacitive Micromachined Ultrasonic Transducers: Technology and Application," *Journal of Medical Ultrasound*, No. 20, pp. 8-31, 2012.

Schneider, J., et al., "A Grayscale Pneumatic Micro-Valve For Use in a Reconfigurable Tactile Tablet for Vision-Impaired Individuals," *J. Micromech. Microeng.*, No. 25, pp. 1-8, 2015.

Seo, D, et al., "Resonating Tactile Stimulators Based on Piezoelectric Polymer Films," *Journal of Mechanical Science and Technology*, vol. 32, No. 2, pp. 631-636, 2018.

Spelmezan, D., et al., "SkinHapties: Ultrasound Focused in the Hand Creates Tactile Sensation," *Haptics Symposium '16, IEEE*, pp. 98-105, Apr. 2016.

Steinhausen, R., "Modelling and Characterization of Piezoelectiie 1-3 Fibre Composites," *SENSOR Proceedings*, Sensor+Test Conferences, pp. 199-204, 2011.

Streque, J, et al., "New Magnetic Microactuator Design Based on PDMS Elastomer and MEMS Technologies for Tactile Display," *IEEE Transactions on Haptics*, vol. 3, No. 2, pp. 88-97, Apr.-Jun. 2010.

Sun, C., et al., "Tactile Sensitivity in Ultrasonic Haptics: Do Different Parts of Hand and Different Rendering Methods Have an Impact on Perceptual Threshold?" *Virtual Reality & Intelligent Hardware*, vol. 1, Issue 3, pp. 265-275, 2019.

Tyler, W., "Neuromodulation by Focused Ultrasound," *NeuroFUS*, 20 pages, 2019.

Ujitoko, Y, et al., "Vibrotactile Signal Generation from Texture Images or Attributes Using Generative Adversarial Network," *Springer International Publishing, Springer Nature*, pp. 25-35, 2018.

Ujitoko, Y, et al., "Vibrotactile Signal Generation from Texture Images or Attributes Using Generative Adversarial Network," *SpringerLink*, https://link.springer.com/chapter10.1007/978-3-319-93399-3_3; pp. 1-4, May 8, 2020.

Wang, J, et al., "Capsule Ultrasound Device: Characterization and Testing Results," *IEEE*, 4 pages, 2017.

Watanabe, J, et al., "Demonstration of Vibrational Braille Code Display Using Large Displacement Micro-Electro-Mechanical Systems Actuators," *Japanese Journal of Applied Physics*, vol. 51, 5 pages, 2012.

Wegener, M., et al., "Voided Cycle-Olefin Polymer Films: Ferroelectrets With High Thermal Stability," *12th International Symposium on Electrets* pp. 47-50, 2005.

Wiertlewski, M., et al., "Mechanical Behavior of the Fingertip in the Range of Frequencies and Displacements Relevant to Touch," *J. of Biomechanics*, vol. 45, No. 11, pp. 1869-1874, 2012.

WIKIPEDIA., "Transplant Conducting Film," *Wikipedia*, https://en.wikipedia.org/wiki/Transparent_conducting_film#, 12 pages, Jun. 22, 2020.

Wong, S., et al., "Capacitive Micromachined Ultrasonic Transducers for Therapeutic Ultrasound Applications," *IEEE Transactions on Biomedical Engineering*, vol. 57, No. 1, pp. 114-123, Jan. 2010.

Wu, X., "A Reconfigurable Tactile Display Based on Polymer MEMS Technology," A Thesis Presented to The Academic Faculty, Georgia Institute of Technology, 218 pages, Apr. 2008.

Xie, X, et al., "Scalable, MEMS-enabled, Vibrational Tactile Actuators for High Resolution Tactile Displays," *J. Micromech. Microeng.*, No. 24, pp. 1-12, 2014.

Xie, X., "High Performance Micro Actuators for Tactile Displays," Dissertation, Northeastern University, Boston MA, 161 pages, May 2017.

Xu, C., et al., "Tactile Display for the Visually Impaired Using TeslaTouch," *CHI*, 6 pages, May 2011.

Yang, C., et al., "Compact, Planar, Translational Piezoelectric Bimorph Actuator with Archimedes' Spiral Actuating Tethers," *Journal of Micromechanics and Microengineering*, vol. 26, 11 pages, 2016.

Yobas, L., et al., "A Novel Integrable Mierovalve for Refreshable Braille Display System," *Journal of Microelectromechanical Systems*, vol. 12, No. 3, pp. 252-262, Jun. 2003.

Zhuang, X, et al., "Fabrication of Flexible Transducer Arrays With Through-Wafer Electrical Interconnects Based on Trench Refilling with PDMS," *Journal of Microelectromechanical Systems*, vol. 17, No. 2, pp. 446-452, Apr. 2008.

* cited by examiner

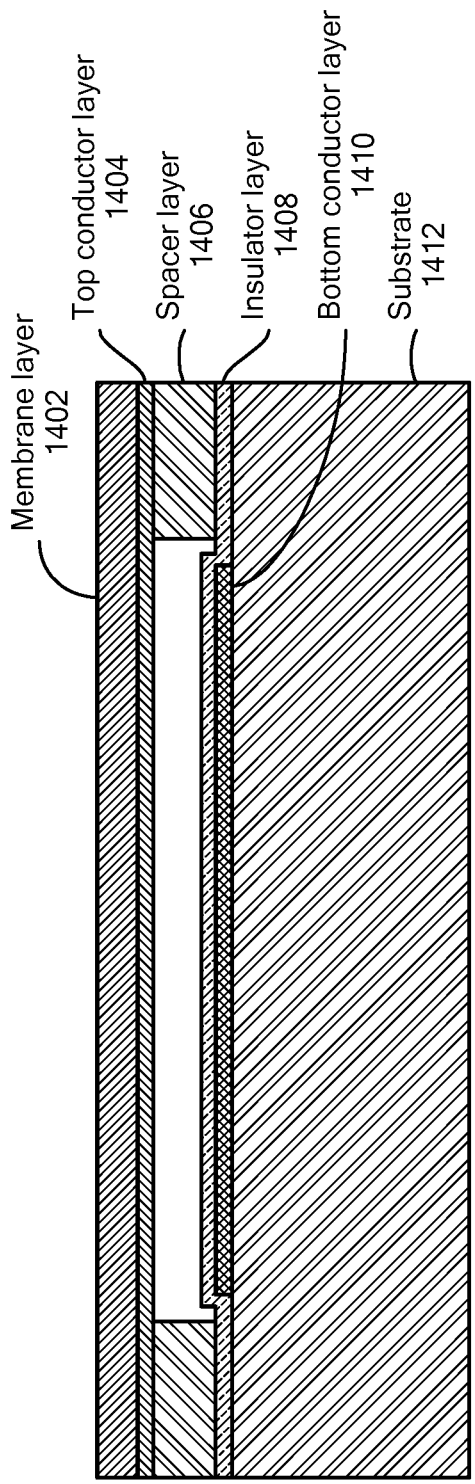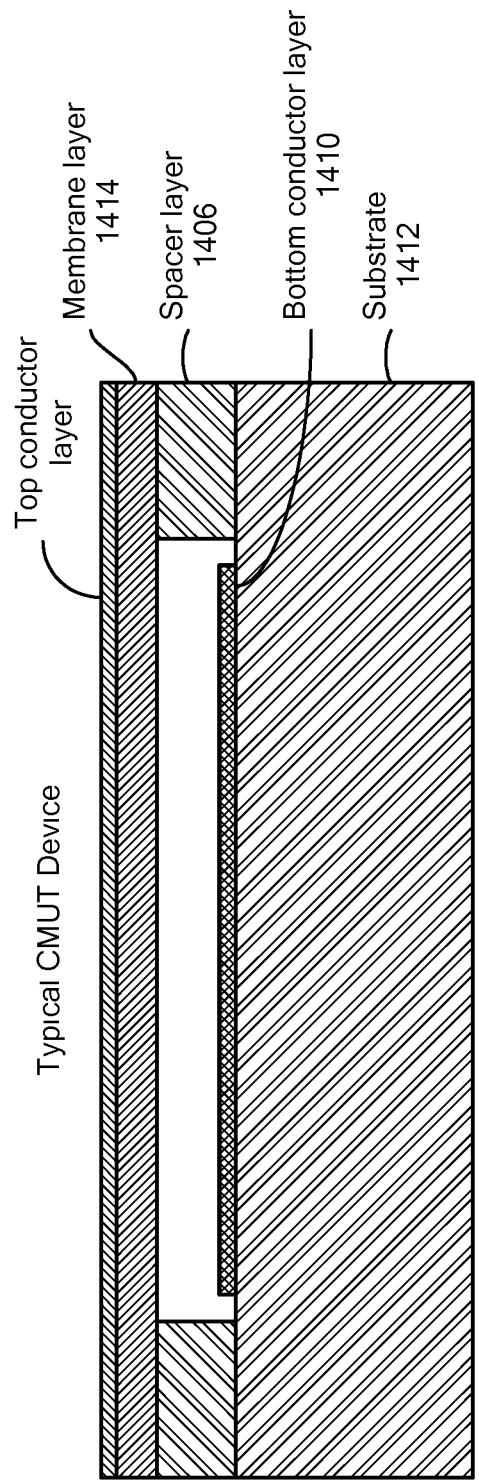
FIG. 14A
FIG. 14B
Typical CMUT Device

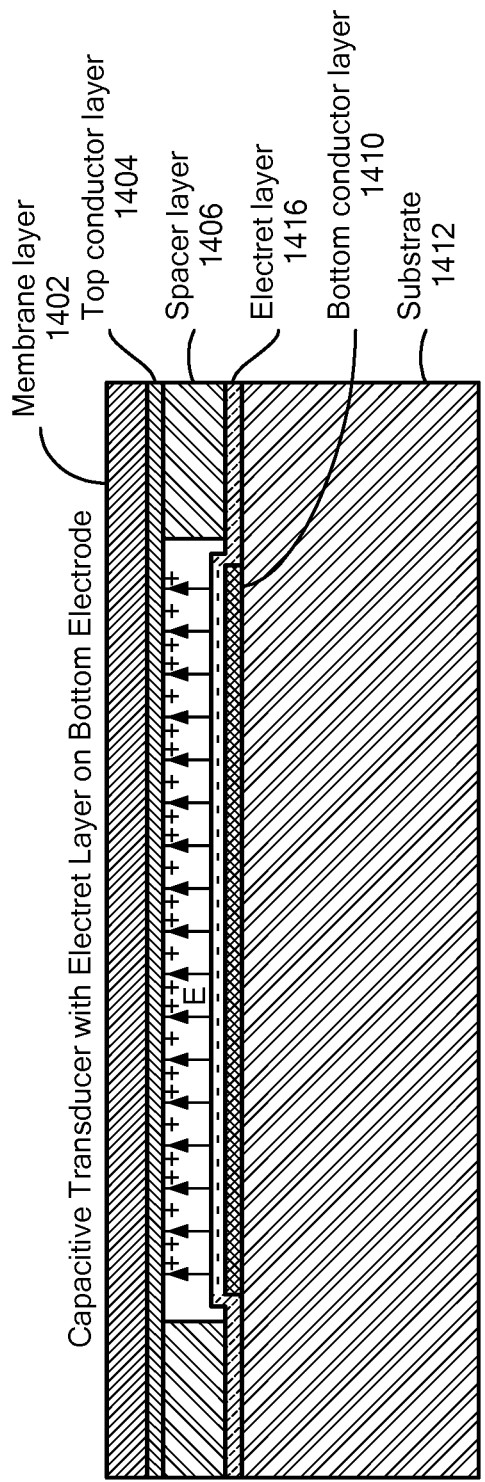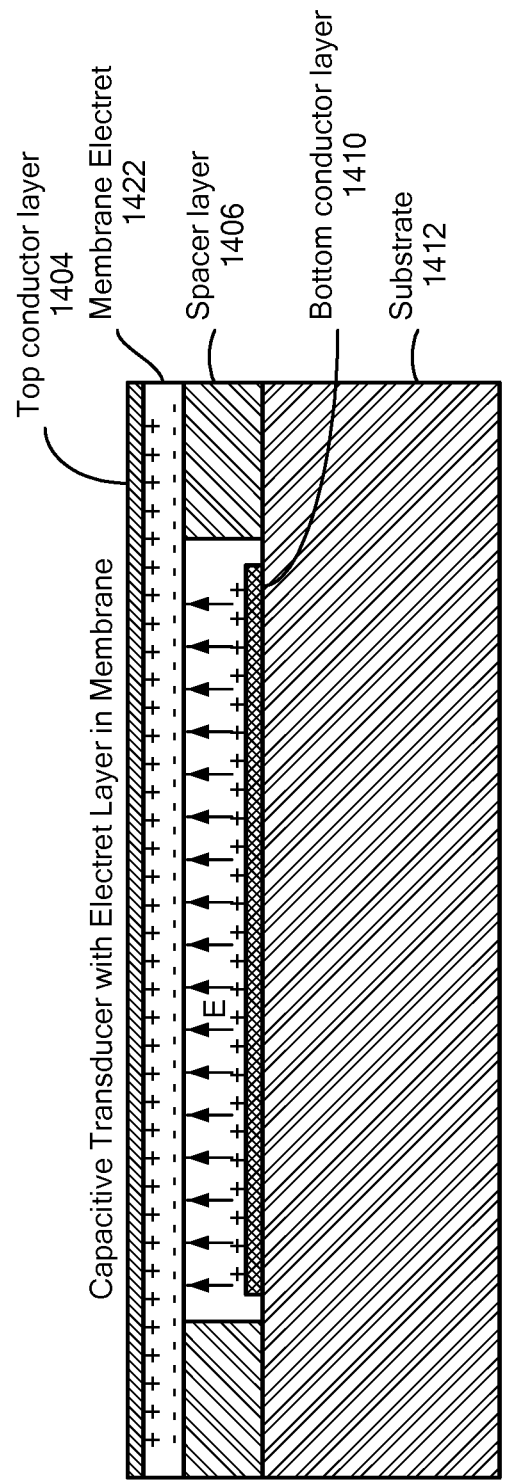

//]:#

MICRO-ELECTRO-MECHANICAL SYSTEMS (MEMS) TACTILE DISPLAY

CROSS-REFERENCE TO RELATED APPLICATIONS

This application claims the benefit of U.S. Provisional Patent Application No. 63,043,939, filed Jun. 25, 2020, titled "Micro-Electro-Mechanical Systems (MEMS) Tactile Display," the entire contents of which are hereby incorporated by reference herein, for all purposes.

TECHNICAL FIELD

The present invention relates to a tactile display and more particularly to a MEMS tactile display capable of communicating text and/or images.

BACKGROUND

Worldwide, there are approximately 39 million blind individuals and 285 million severely vision-impaired individuals. In the United States alone, there is an estimated 26.9 million adults who have trouble seeing, even when wearing corrective lenses, or unable to see at all. Vision-impaired individuals may use existing electronic tactile (Braille) displays to read printed or electronic content. However, fifty percent of printed and Internet content is contained in images, which cannot be communicated by existing tactile displays. Text-to-speech translators also cannot communicate such images. Further, existing refreshable tactile displays are expensive (a single line of 20-80 Braille characters costs several thousand dollars), are large in size, require high voltages to operate, have low resolution (6 or 8 dots/letters, 2.5 mm pitch), and are limited to displaying only a couple lines of text simultaneously.

SUMMARY OF THE EMBODIMENTS

In accordance with one embodiment of the invention, a tactile human-user interface system includes an interface configured to receive input from an electronic device, in which the input includes text and/or an image. The system also includes an image defeature filter configured to defeature each image of the set of images so as to produce a simplified form of each image. The system further includes a conversion engine configured to translate the device input into a tactile form, and convert the tactile form into a set of electrical signals, such that the set of electrical signals is associated with a set of pixels. The system also includes a set of transducers, each transducer or a subset of the set of transducers corresponding to a respective pixel of the set of pixels. The set of transducers is configured to receive, from the processor, the set of electrical signals, and generate, in response to the set of electrical signals, outputs detectable by a finger of a human user, at locations corresponding to pixels of the set of pixels.

In some embodiments, the system comprises a micro-electro-mechanical system (MEMS). In some embodiments, the electronic device is a computing device that provides the device input from data retrieved and/or displayed by the computing device, the computing device including a tablet, mobile phone, laptop computer, or personal computer. In some embodiments, the electronic device is a device that captures the device input from surroundings of the user, including a camera, a scanner, or a LIDAR. In some embodiments, the image defeature filter is configured to defeature an image in the device input by (i) enhancing edges of the image, (ii) converting objects in the image to iconic form, (iii) sorting objects in the image by proximity or range, and/or (iv) removing details from objects in the image to create an outline of the objects.

In some embodiments, the tactile form is Braille or a tactile pattern. In some embodiments, the conversion engine is configured to code the tactile pattern into the set of electrical signals by modulating at multiple frequencies, modulating at multiple amplitudes, or double modulation. In some embodiments, the coded electrical signals represent (i) distance, (ii) proximity, and/or (iii) color. In some embodiments, the outputs are vibration, pressure, or bi-static displacement. In some embodiments, the outputs have a frequency of about 250 Hz. In some embodiments, an audio circuit coupled to the conversion engine is configured to generate speech output corresponding to the output. In some embodiments, the set of transducers function as a directional speaker that projects generated speech output to ears of the user. In some embodiments, the output is configured to provide a tactile navigation display to the human user.

In some embodiments, the set of transducers is an array of capacitive micro-machined transducers (cMUTs), such that each cMUT or a sub-array of the array of cMUTs corresponds to a respective pixel of the human-user interface. In some embodiments, each cMUT includes an electret layer, which is configured either: (i) over a bottom conductive electrode of the cMUT, (ii) as part of a membrane layer of the cMUT, or (iii) as a porous layer between the bottom conductive electrode and a top conductive electrode of the cMUT.

In some embodiments, each cMUT defines a ventilation through hole. In some embodiments, each cMUT includes a boss.

In some embodiments, each transducer is configured to detect a capacitance level at a corresponding pixel, the capacitance level being caused by the finger of the human user touching a location corresponding to the pixel. In these embodiments, the system further includes a differential capacitance readout circuit configured to compare the capacitance level at the pixel with (i) capacitance levels at adjacent pixels or (ii) a threshold value, and determine input provided by the human user at the pixel. In some embodiments, the transducer is further configured to activate the output at the pixel, in response to the detected capacitance level at the pixel.

In some embodiments, the set of transducers is an array of electromagnetic actuators, such that each electromagnetic actuator or a sub-array of the array of actuators corresponds to a respective pixel on the human-user interface. In some embodiments, the array of electromagnetic actuators are positioned above a magnetic material formed to concentrate flux and/or achieve bi-stability. In these embodiments, each electromagnetic actuator includes: (i) a permanent magnet and (ii) a coil, such that an electrical signal drives the actuator by causing the magnet and/or the coil to vibrate. In some embodiments, the array of electromagnetic actuators has a pressure switch configured to detect pressure by the finger of the user at a pixel, and in response, activate output at a location corresponding to the pixel. Actuating only the pixels touching fingers results in lower power consumption and longer battery life.

In some embodiments, the set of transducers is an array of piezoelectric micro-machined transducers (pMUTs), such that each pMUT or a sub-array of the array of pMUTs corresponds a respective pixel on the human-user interface.

In some embodiments, the set of transducers is situated beneath a polymer sheet. In some embodiments, the set of transducers is formed into a thin device layer that fits over a screen of a computing device, including a cell phone, tablet, laptop, or personal computer. In some embodiments, the set of transducers is configured as part of a glove worn by the human user. In some embodiments, alternating pixels in the set of pixels are configured to be actuated with waveforms that are 180° out of phase, so as to reduce the output by 20-40 dB for quiet operation of the system, compared to actuating each of the set of pixels with the same phase.

BRIEF DESCRIPTION OF THE DRAWINGS

The foregoing features of embodiments will be more readily understood by reference to the following detailed description, taken with reference to the accompanying drawings, in which:

FIGS. 14A-14E show different configurations of the cMUT array of FIG. 12A, according to respective embodiments of the present invention;

DETAILED DESCRIPTION OF SPECIFIC EMBODIMENTS

Definitions. As used in this description and the accompanying claims, the following terms shall have the meanings indicated, unless the context otherwise requires:

"Bi-static displacement" means vertically translating a pixel of a tactile display to one of two positions, an upper position of which is at a height and with a force that simulates the sensation of a Braille dot to a human user, and the pixel remains at the height until a refresh is performed of the pixel.

"Tactile form" is a data representation, such as Braille, that can be presented on a tactile display in a manner that can be sensed by a fingertip of a human user.

Embodiments of the present invention provide refreshable tactile displays in resolution as high as can be sensed by a human's fingertips (~1 mm pitch) and producible in sizes that can be overlaid over a screen, for example a screen of a cellphone or a tablet computer. In these embodiments, the refreshable tactile displays are produced using micro-electro-mechanical systems (MEMS) technology that output pixel-level vibrations or bi-static displacement, including dense micro-transducer arrays formed of capacitive micromachined transducers (cMUTs), piezoelectric micromachined transducers (pMUTs), electromagnetic actuators, or other MEMS transducers. As used herein, the terms cMUT and pMUT are used to refer to devices that operate at sonic, subsonic or ultrasonic frequencies. These tactile displays are less expensive and may require less voltage and/or less power than traditional tactile displays and can communicate both text (as Braille) and images (as tactile patterns) to the fingertip of a human user. In some embodiments, a micro-transducer may require more voltage than a conventional Braille bimorph display, however in these embodiments, the required power is substantially lower than a Braille bimorph display.

Figure 1:
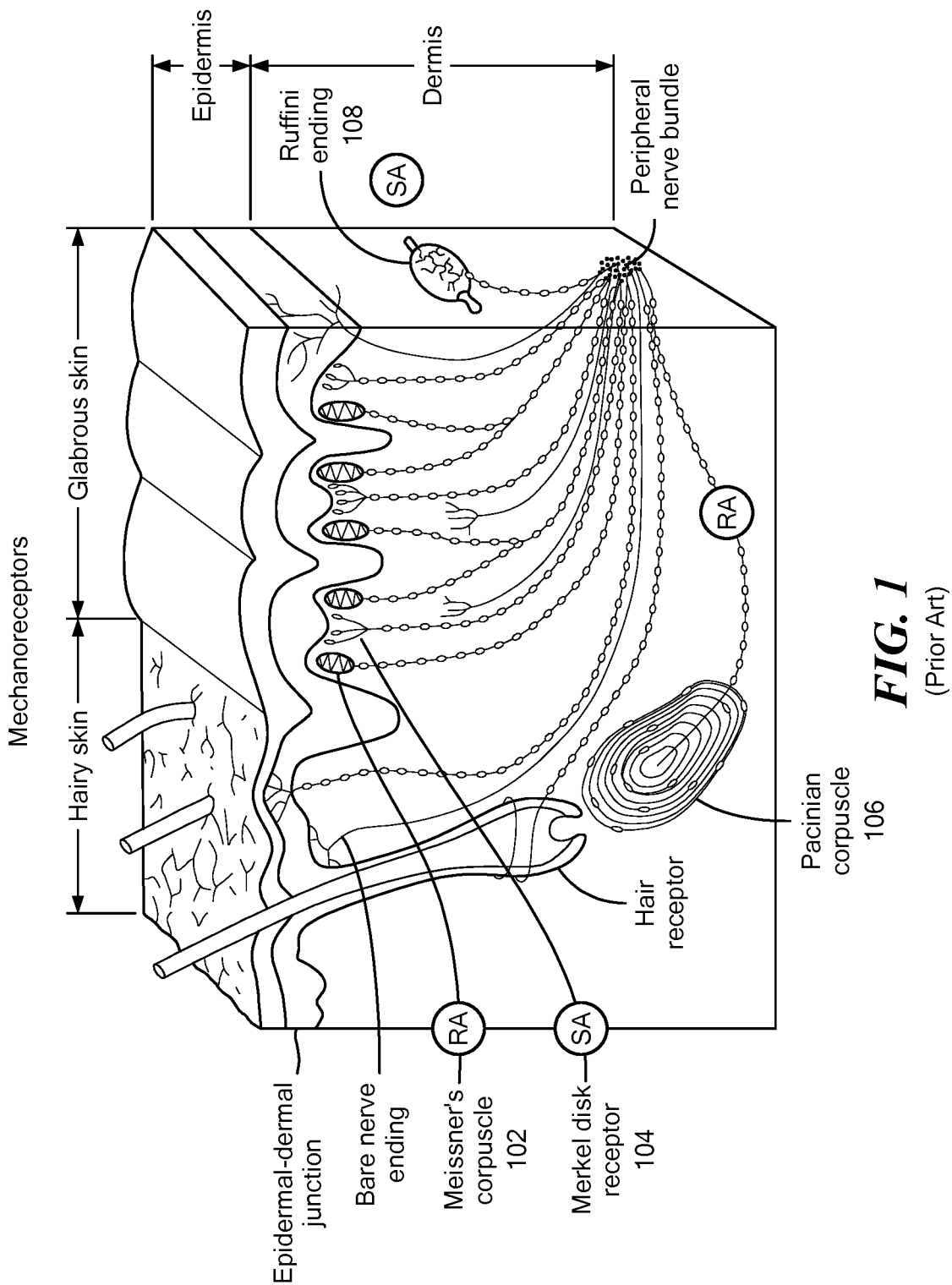
FIG. 1 is a perspective cross-sectional view of mechanoreceptors of human skin which sense tactile stimulation, according to prior art.

FIG. 1 is a perspective cross-sectional view of mechanoreceptors of human skin, which sense tactile stimulation, according to prior art. The mechanoreceptors are sensitive to mechanical pressures applied to, and deformation of, the skin. Four primary types of mechanoreceptors include: Meissner's corpuscle 102, Merkel's disk receptor 104, Pacinian corpuscle 106, and Ruffini ending 108. FIG. 1 shows the locations of each of these receptors 102, 104, 106, 108 in human skin.

Each receptor is specialized to be sensitive to certain stimuli based on the receptor's depth and/or location in the skin, receptive field size, rate of adaption, frequency of the stimulation, and other physiological properties. The rate of adaption includes rapid adapting (RA), which detects short pulses such as vibration, and slow adapting (SA), which detects constant stimulus. The Meissner's corpuscle 102, located in the shallow superficial skin area, has a receptive field with spatial resolution of 3-5 mm, RA fibers, and best detects stimulation in the frequency range of 3-40 Hz. Accordingly, the Meissner's corpuscle 102 best senses skin local deformation and low frequency vibration (e.g., <1 μm displacement vibrations). The Merkel's disk receptor 104, located in the shallow superficial skin area, has receptive field with spatial resolution of 2-3 mm, SA fibers, and best detects stimulation in the frequency range of 0.3-3 Hz. Accordingly, the Merkel's disk receptor 104 best senses pressure. The Pacinian corpuscle 106, located in the deep subcutaneous tissue, has a receptive field with spatial resolution>20 mm, RA fibers, and best detects stimulation in the frequency range of greater than 500 Hz. Accordingly, the Pacinian corpuscle 106 best senses high frequency vibration. The Ruffini ending 108, located in the deep subcutaneous tissue, has a receptive field with spatial resolution>10 mm, SA fibers, and best detects stimulation in the frequency range of 15-400 Hz. Accordingly, the Ruffini ending 108 best senses stretching and tension of the skin. Fingertips are the parts of the human hand with the most receptors and are the most sensitive to such stimulation.

The sensing of tactile stimulation by mechanoreceptors is further described in the publication "The tactile senses & haptic perception" by Jussi Rantala, et al., Tampere Unit for Computer-Human Interaction School of Information Sciences, University of Tampere, Finland (2014), which is herein incorporated by reference in its entirety, for all purposes. Embodiments of the present invention generate stimulation for detection by fingertips of a human user based on the sensing capabilities of one or more of these mechanoreceptors. For example, embodiments generate vibrations at a set of pixels of a tactile display such that the vibrations can be sensed by Meissner's corpuscles or Pacinian corpuscles in the user's fingertip, which are sensitive to vibrations and have low spatial resolution.

Figure 2:
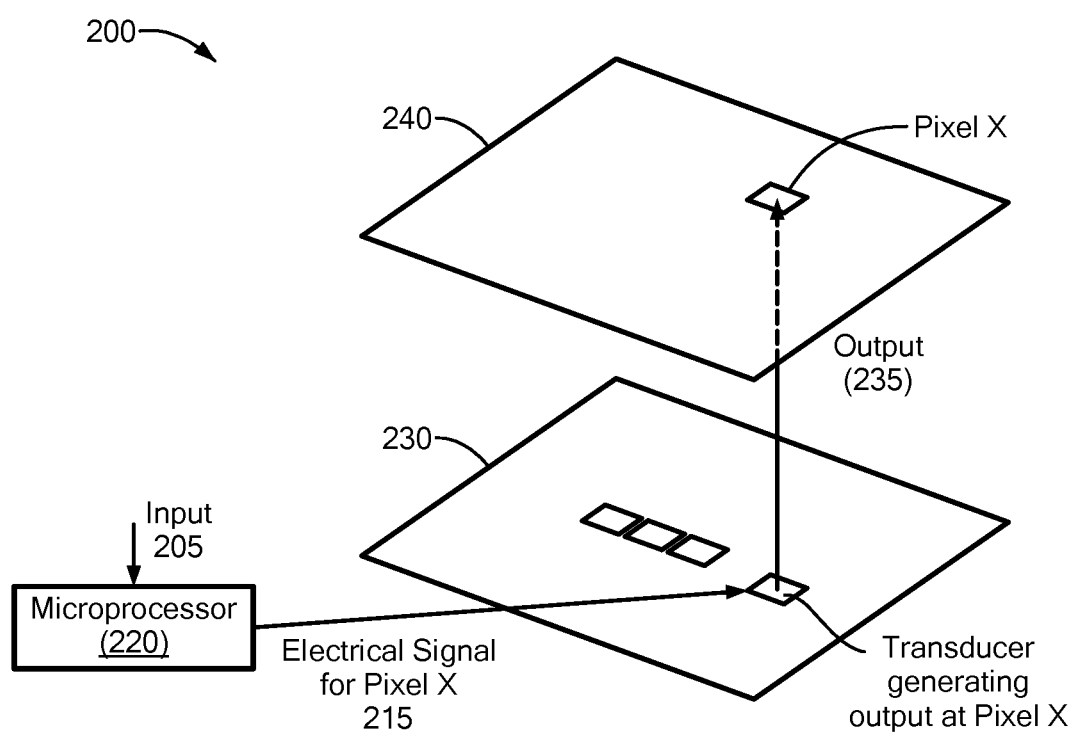
FIG. 2 shows a partially schematic block diagram of a tactile human-user interface system, in accordance with embodiments of the present invention.

FIG. 2 shows a partially schematic block diagram of a tactile human-user interface system 200, according to embodiments of the present invention. In the embodiment of FIG. 2, the system 200 is a micro-electro-mechanical system (MEMS).

Figure 9:
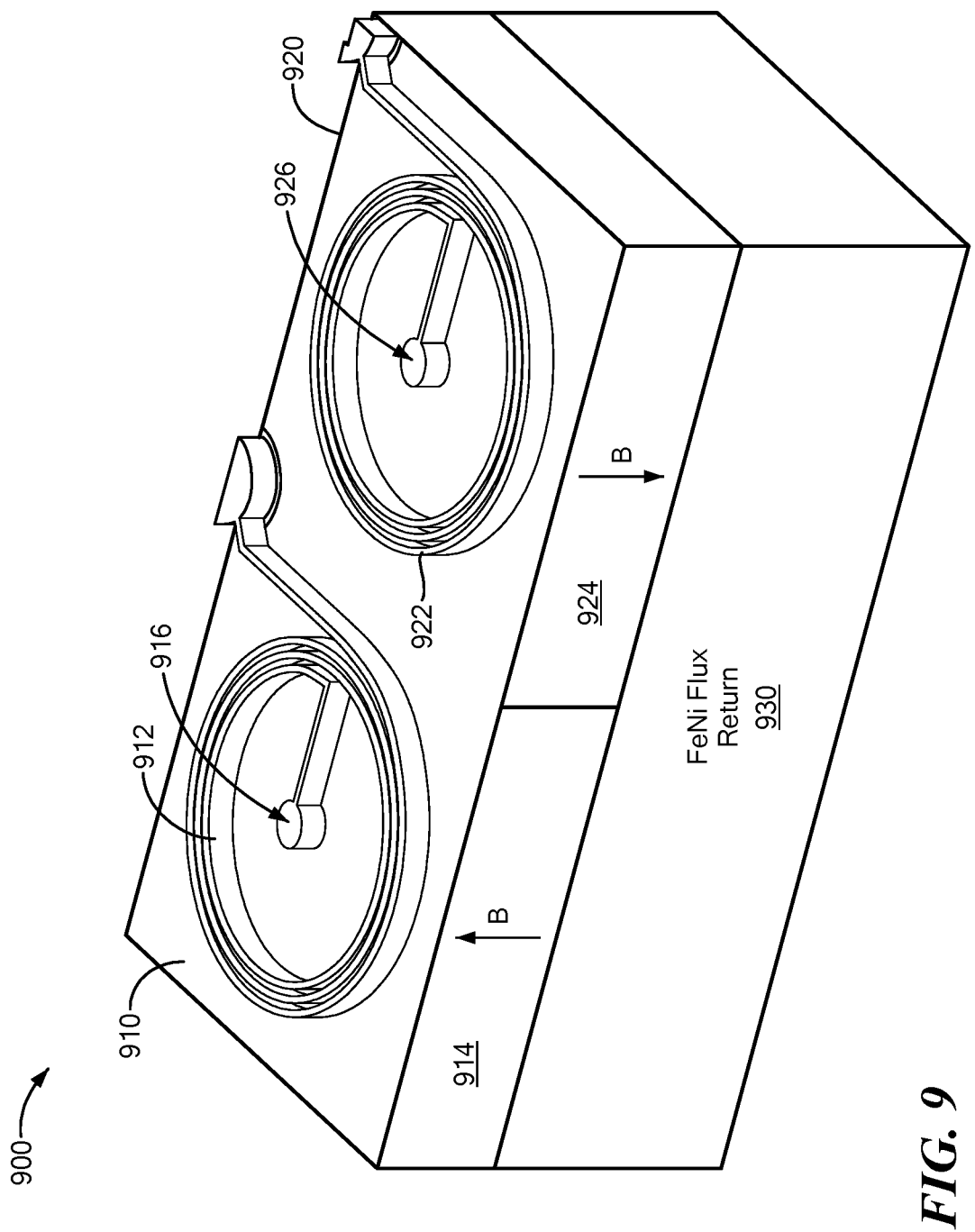
FIG. 9 shows a moving-coil array of an electromagnetic actuator with fixed magnets and moving coils, used in some embodiments of the system of FIG. 2 to generate tactile output to a user.
Figure 10:
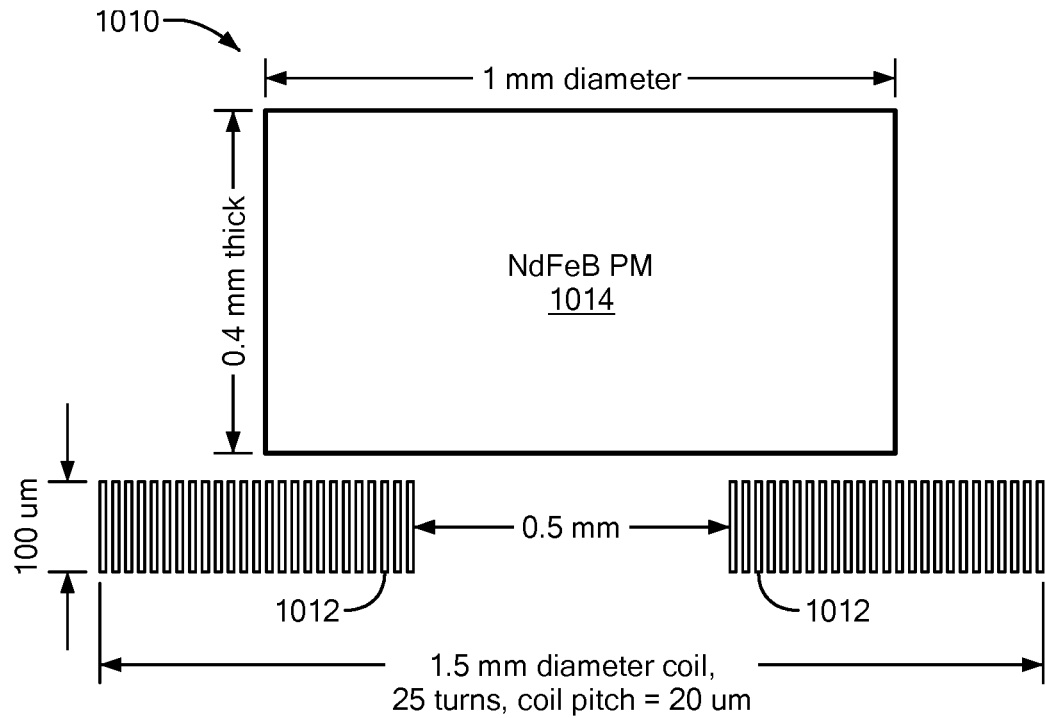
FIG. 10 shows a pixel in a moving-magnet array of an actuator with a fixed coil and a vibrating magnet, used in some embodiments of the system of FIG. 2 to generate tactile output to a user.
Figure 11:
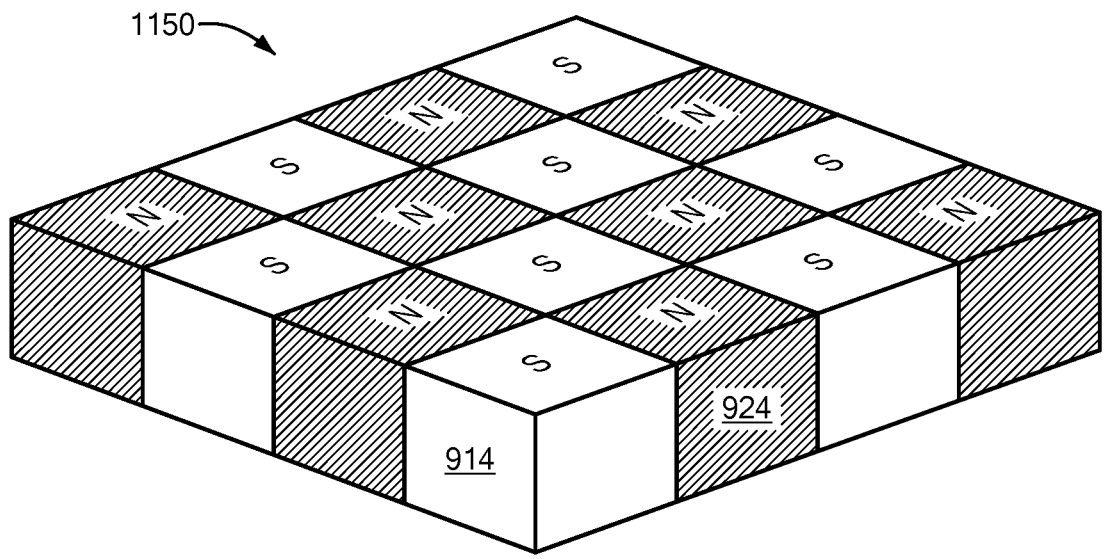
FIG. 11 shows a magnetic array contained in the electromagnetic actuator array of FIG. 9, according to embodiments of the present invention.

The system 200 includes a micro-processor 220 and an array of micro-transducers 230 situated beneath a cover sheet 240. In some embodiments, the cover sheet 240 is a stretched polymer sheet. In some embodiments, the system 200 does not include a cover sheet. In some embodiments, the micro-transducers array 230 is an electromagnetic actuator array (as shown in FIGS. 9-11), a cMUT array with or without electrets (as shown in FIGS. 12-14), a pMUT array (as shown in FIGS. 15-18), a piezoelectric dice and fill array (as shown in FIG. 19), an array of micro-transducers fabricated on a printed circuit (PC) substrate (as shown in FIGS. 27-31), or another suitable MEMS transducer array.

In the embodiment of FIG. 2, each micro-transducer of the array 230, or a sub-array of the array 230 of transducers, is associated with a pixel, such that the micro-transducer or the sub-array of the array 230 of transducers generates output for that pixel at a location corresponding to the pixel. The location may be on the under-side of the cover sheet 240, as shown in FIG. 2. In other embodiments, each micro-transducer of the array 230 may be associated with a set of adjacent pixels, such that the micro-transducer array 230 generates sensor output for that set of adjacent pixels at a location corresponding to the set of adjacent pixels of the array 230. In other embodiments, a single pixel may contain multiple MEMS transducer cells. In other words, in some embodiments, each transducer of the micro-transducer array 230 corresponds to a single pixel, whereas in other embodiments, a set of transducers of the micro-transducer array 230 corresponds to a single pixel.

In embodiments, the output generated by the micro-transducers array 230 provides tactile features spaced apart about 1-2 mm, which can be distinguished by the finger of a human user. In embodiments, each transducer generates vibration or bi-static displacement output for its respective pixel. For example pressure may be used to bulge or lift a pixel of the display locally to produce bi-static displacement. The vibration output and bi-static displacement output are produced at a frequency sensed by particular mechanoreceptors (e.g., Meissner's corpuscles 102 and/or Pacinian corpuscles 106 of FIG. 1) in the user's fingertip (e.g., about 250 Hz). The advantage of vibration, over bi-static displacement, is that the finger can sense about 1-5 um vibration displacement but needs about 500 um static displacement for reliable detection.

Figure 3:
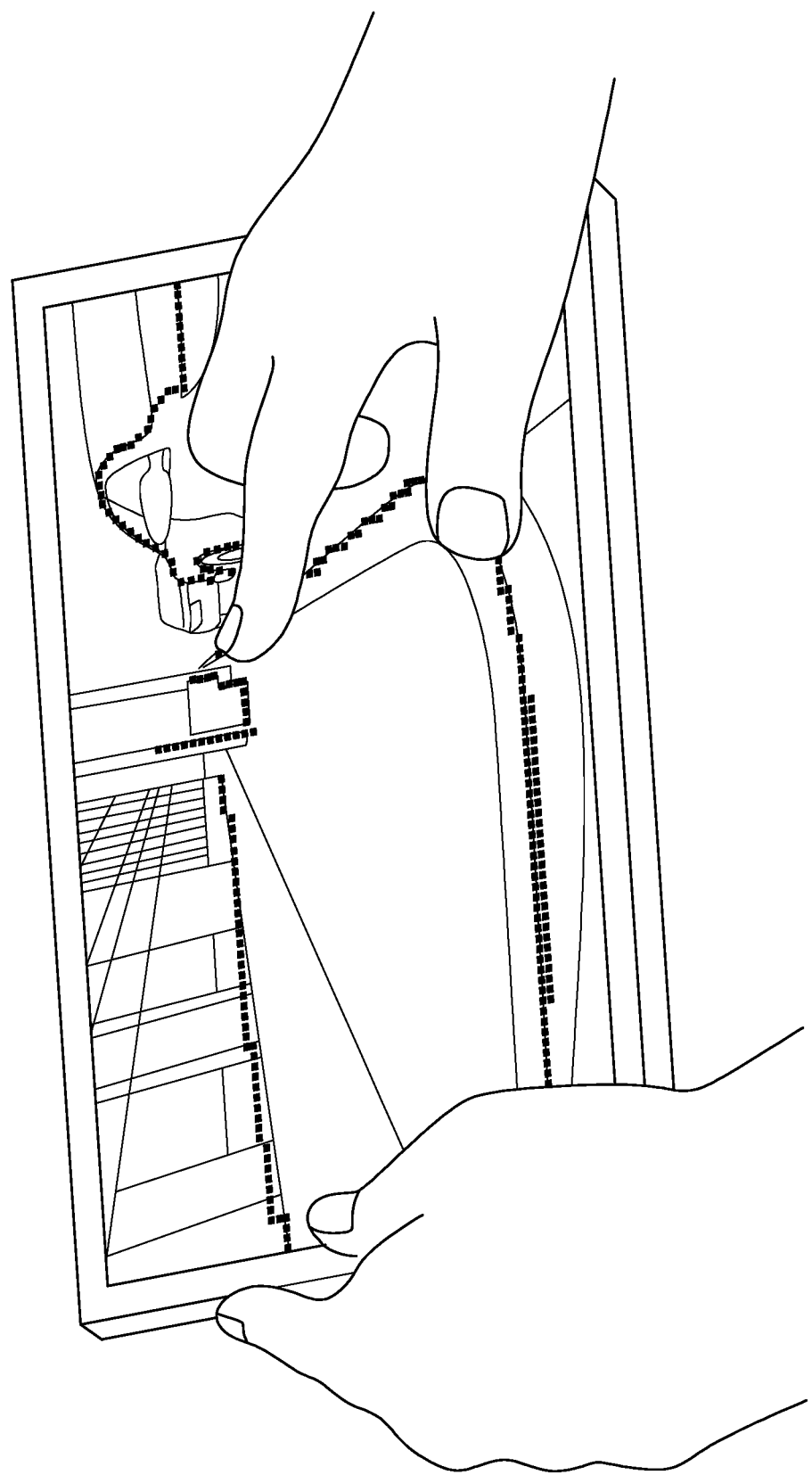
FIG. 3 shows a tablet device with a tactile display overlaid over the device's screen, in accordance with embodiments of the present invention.

In embodiments, the micro-processor 220, micro-transducers array 230 and cover sheet 240 form a refreshable tactile display that is positioned as a thin-layer over a screen (e.g., LCD display) of a computing device, such as a tablet computer or a mobile telephone. In embodiments, the tactile display includes the micro-transducers array 230 in a first user interface layer, electrical components in a second layer, and pixelated camera or other light sensitive device (e.g. an array of photo-diodes or photo-transistors) that captures images from the screen in a third layer. In some embodiments, the micro-processor 220 is replaced with a processor that is located external to the system 200, such as in the desktop computer or tablet computer or mobile telephone, and communicatively coupled to the system 200 (i.e., not part of the thin-layer positioned over the screen). The system 200 may be produced and assembled in varying shapes and sizes to fit over the screen of any type of computing devices, including a tablet computer, a cell phone, a laptop computer, a personal computer, an e-reader, etc. For example, FIG. 3 shows an embodiment of the system that fits over the screen of a tablet computer. For another example, FIG. 4 shows an embodiment of the system that fits over the screen of a cell phone.

In other embodiments, the system 200 is configured as a device that is produced in varying shapes and sizes, such as cell phone shape/size and tablet shape/size. In other embodiments, the system 200 is configured as a glove worn by the user.

In the embodiment of FIG. 2, the micro-processor 220 receives, via an interface, input 205 from an electronic device, such as a GPS receiver or a computer executing a web browser. The device input 205 may include text and/or images. The device input 205 may be received as a single input or in a continuous, occasional or periodic manner from the electronic device, for example via a HDMI, VGA, USB or other suitable computer or computer or video interface.

Figure 4:
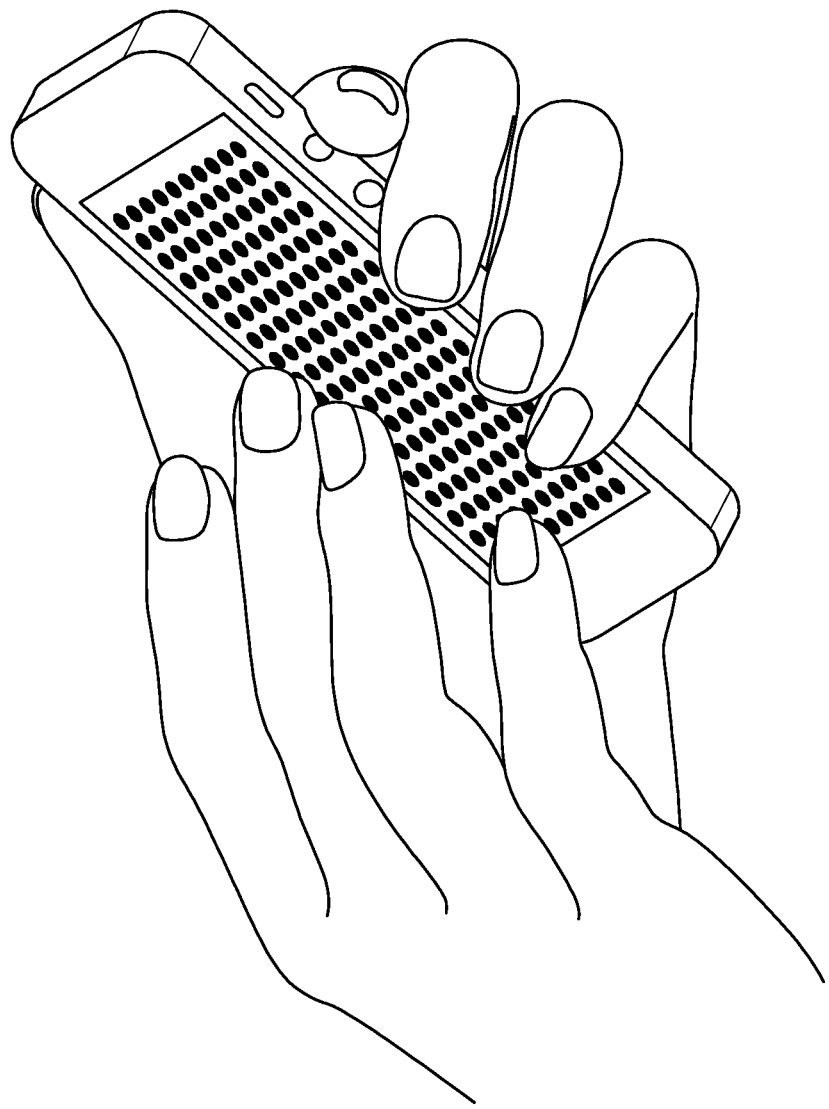
FIG. 4 shows a mobile phone with a tactile display overlaid over the device's screen, in accordance with embodiments of the present invention.

In some embodiments, the electronic device may be a computing device with the system 200 positioned over its screen, such as shown in FIGS. 3 and 4. In some embodiments, the device input 205 may be data that are processed and/or displayed by the computing device, such as content retrieved from the Internet or other communicatively coupled network or device, or content stored on, or generated by, the computing device. In some embodiments, the electronic device may be a device that captures images, such as a camera (e.g., single, binocular, with structured lighting, etc.), a scanner, a LIDAR, etc. For example, the device may be a camera that captures text and/or images from traditional books or other electronic content. For another example, the device may be a camera or LIDAR that captures the surroundings of the user in 2-dimensions (2D) or 3-dimensions (3D). For a further example, the device may be a camera that captures images from a screen over which the system 200 is positioned.

Figure 5:
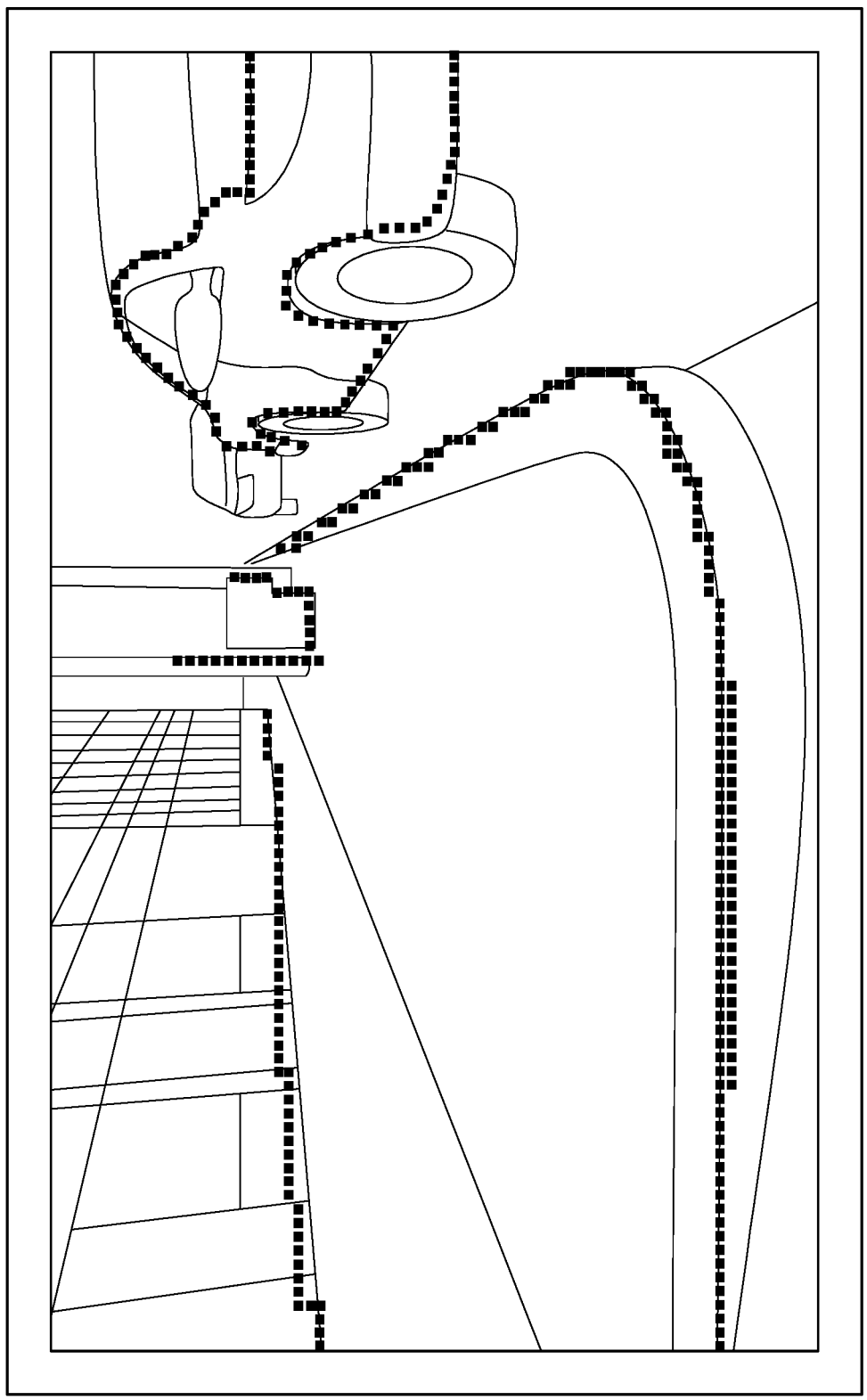
FIG. 5 is an exemplary image overlaid with pixels to defeature the image, according to an embodiment of the present invention.
Figure 6A:
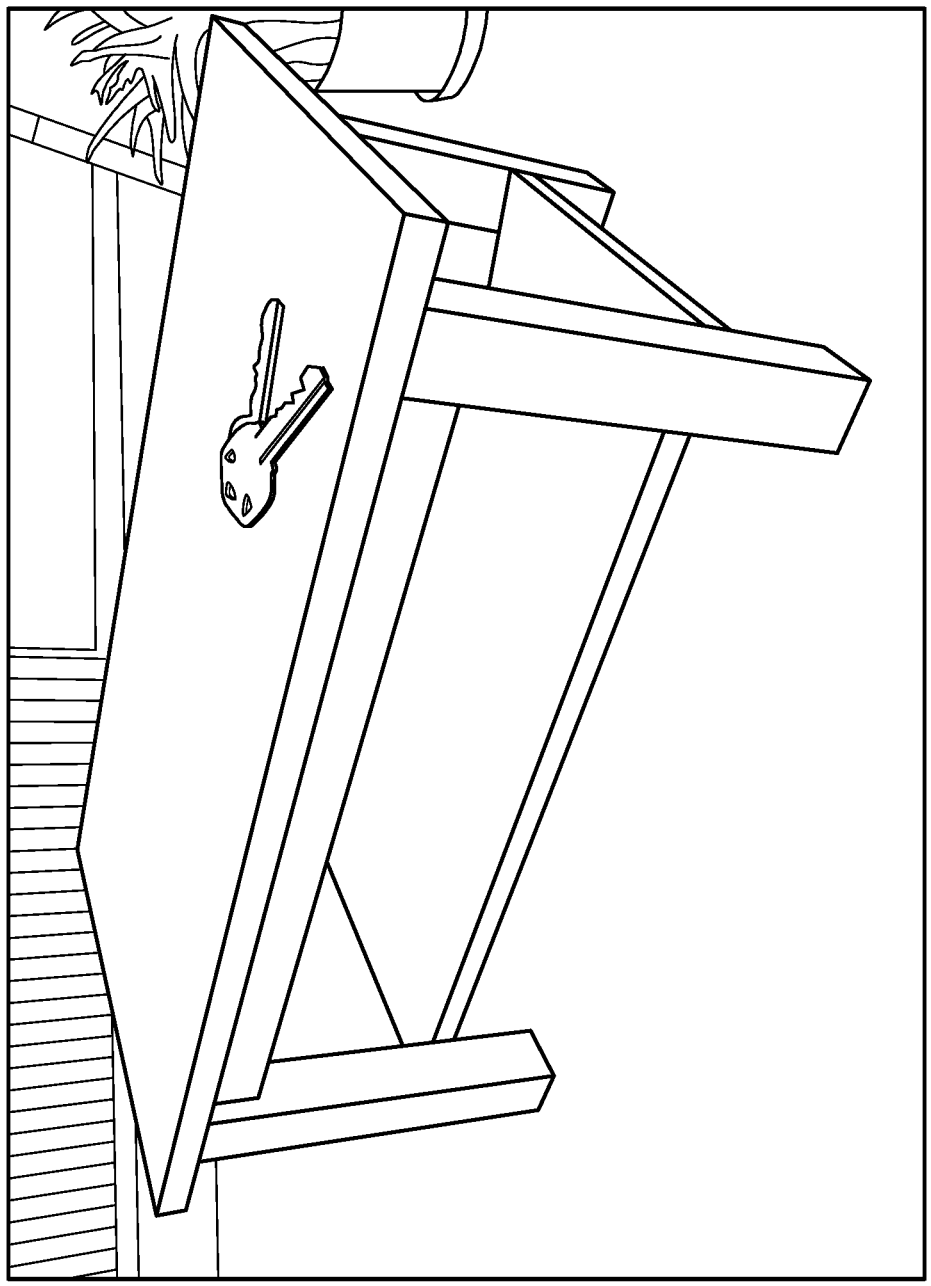
FIG. 6A shows an example image received by the system of FIG. 2, according to an embodiment of the present invention.
Figure 6B:
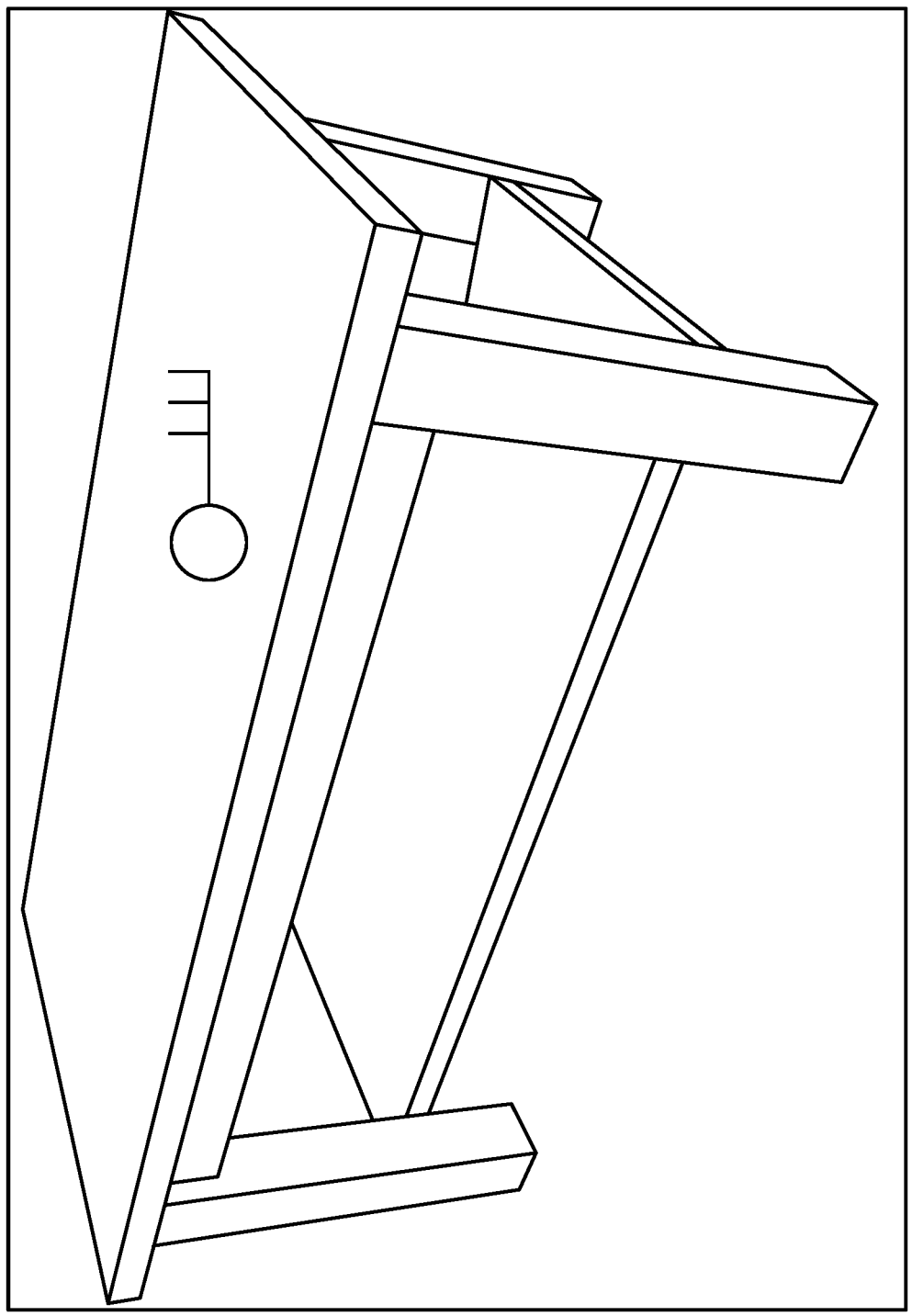
FIG. 6B shows the example image of FIG. 6A after being defeatured by the system of FIG. 2, according to embodiments of the present invention.

If the device input 205 includes images, the micro-processor 220 executes an image defeature filter that automatically defeatures the images to provide simplified versions of the images. The image defeature filter may execute software, such as computer-aided design (CAD) software or artificial intelligence (AI) software, that is known to one skilled in the art to provide defeaturing of an image. Such software may automatically recognizes non-essential object details within objects of the image, such as details less than a certain size or resolution, or details inside an outline of a shape, and remove them to create an outline of the object. Such software may also recognize objects (e.g., people, cars, animals, etc.) in an image and convert the recognized objects into icons. Such software may further recognize entire objects that are non-essential within the image, and remove them from the image. For example, a camera may capture a surrounding scene as a blind user walks down a sidewalk, and the software may remove billboards from the scene while enhancing features that represent hazards, such as curbs or holes. Such software may also enhance edges of the image (as shown in FIG. 5) and sort and/or order objects within the image by proximity or distance. In other embodiments, a range gate may also be used to sort objects by proximity in an image. The image defeature filter may apply any defeaturing functions of such software known to one skilled in the art to simplify the image. FIG. 6A shows an example image contained in device input received by the system 200, which is a table with keys placed on top. FIG. 6B shows the image of FIG. 6A after being defeatured by the system 200 to a line drawing and the keys rendered into an icon representation that is easily recognizable by touch, in accordance with an embodiment of the present invention.

Figure 7:
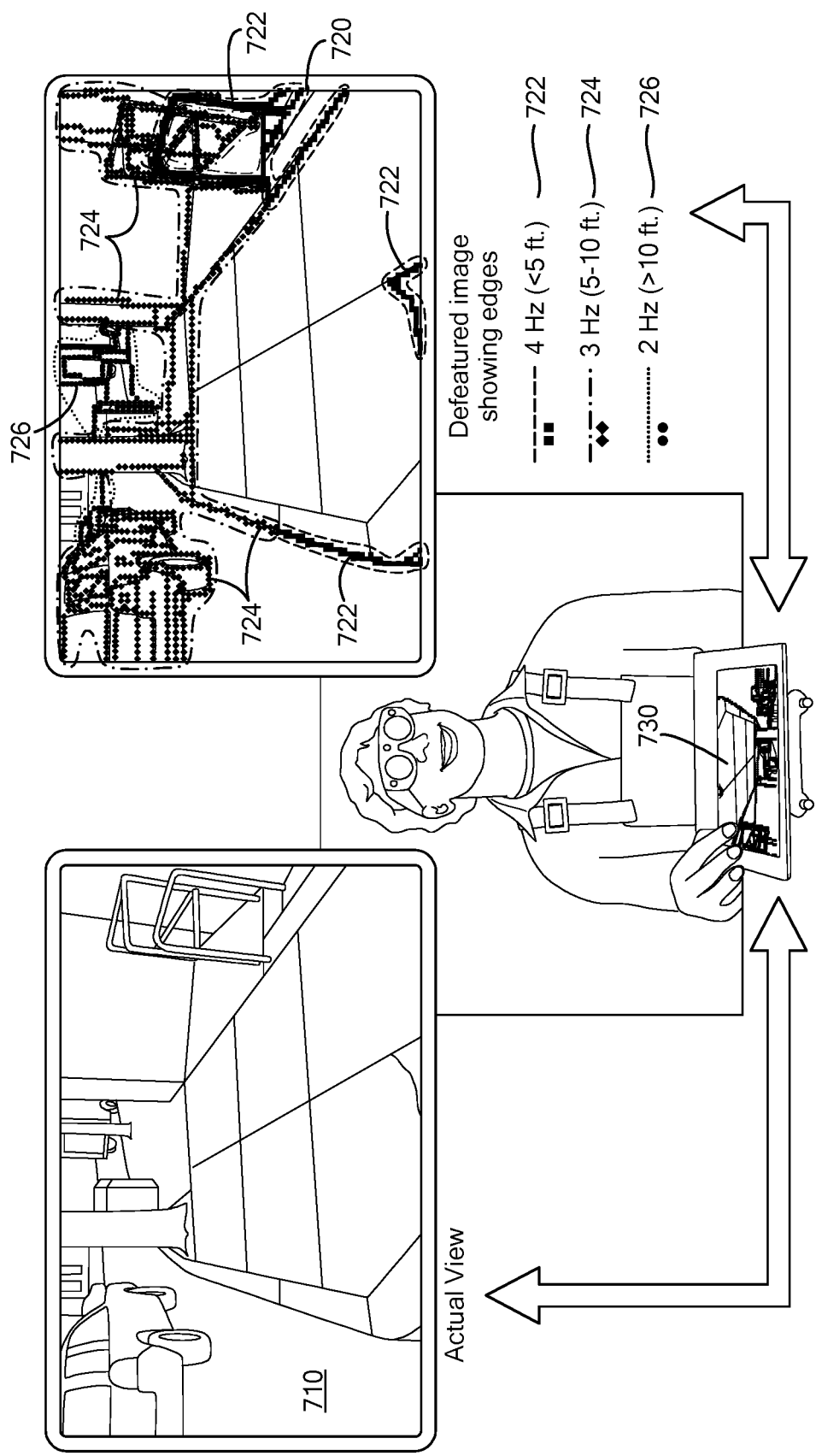
FIG. 7 shows a tablet device with a tactile display configured for navigation, in accordance with an embodiment of the present invention.

FIG. 7 shows a tablet device with a tactile display configured for navigation, in accordance with an embodiment of the present invention. In the example of FIG. 7, a human user is navigating a sidewalk with the system 200 overlaid on a tablet device 730. The system 200 receives an image 710 of the sidewalk captured by one or more cameras connected to the tablet device 730, such as a camera in the tablet device 730 or a camera in glasses worn by the user. The system 200 generates a tactile image 720 by defeaturing the image 710 and using a connected LIDAR (which measures range) to modulate-code (shown in color) edge features according to their distance to the user. In this embodiment, nearby, such as closer than 5 feet, features are modulated at a relatively high frequency, such as about 4 Hz, and shown in red 722; intermediate range features, such as between about 5 and 10 feet, are modulated at an intermediate frequency, such as about 3 Hz, and shown in yellow 724, and more distant features, such as greater than about 10 feet, are modulated at a relatively low frequency, such as about 2 Hz, and shown in green 726. In other embodiments, other frequencies can be used, other ranges of distances can be used, and other numbers of ranges of distances can be used. Furthermore, in other embodiments, low relative frequencies can be used to represent near objects and relatively high frequencies can be used to represent distant objects. A double modulation may be used in which a "carrier frequency" where the finger is highly sensitive (e.g. 100-300 Hz) is modulated at a lower frequency (e.g. 1-10 Hz) to encode range, color or other information.

The micro-processor 220 executes instructions that implement a conversion engine that translates the device input 205, with any images in the device input defeatured, into tactile form. In embodiments, the conversion engine executes software that translates text within the device input to the tactile form of Braille and images in the device input 205 to tactile patterns that represents distance, proximity, range, color, identity (ex. icon), etc. of objects within an image. The tactile form is mapped to the set of pixels that are to be used to output the device input 205 to the human user. For example, if the system 200 is to be positioned over a computing device's screen, the set of pixels may correspond (register) to pixels on that screen or a zoomed-in section of the screen. The tactile form is mapped to the set of pixels such that tactile features can be output to the user in a resolution that can be sensed by the fingertips of the user (which senses with about 1-1.5 mm resolution).

Figure 21:
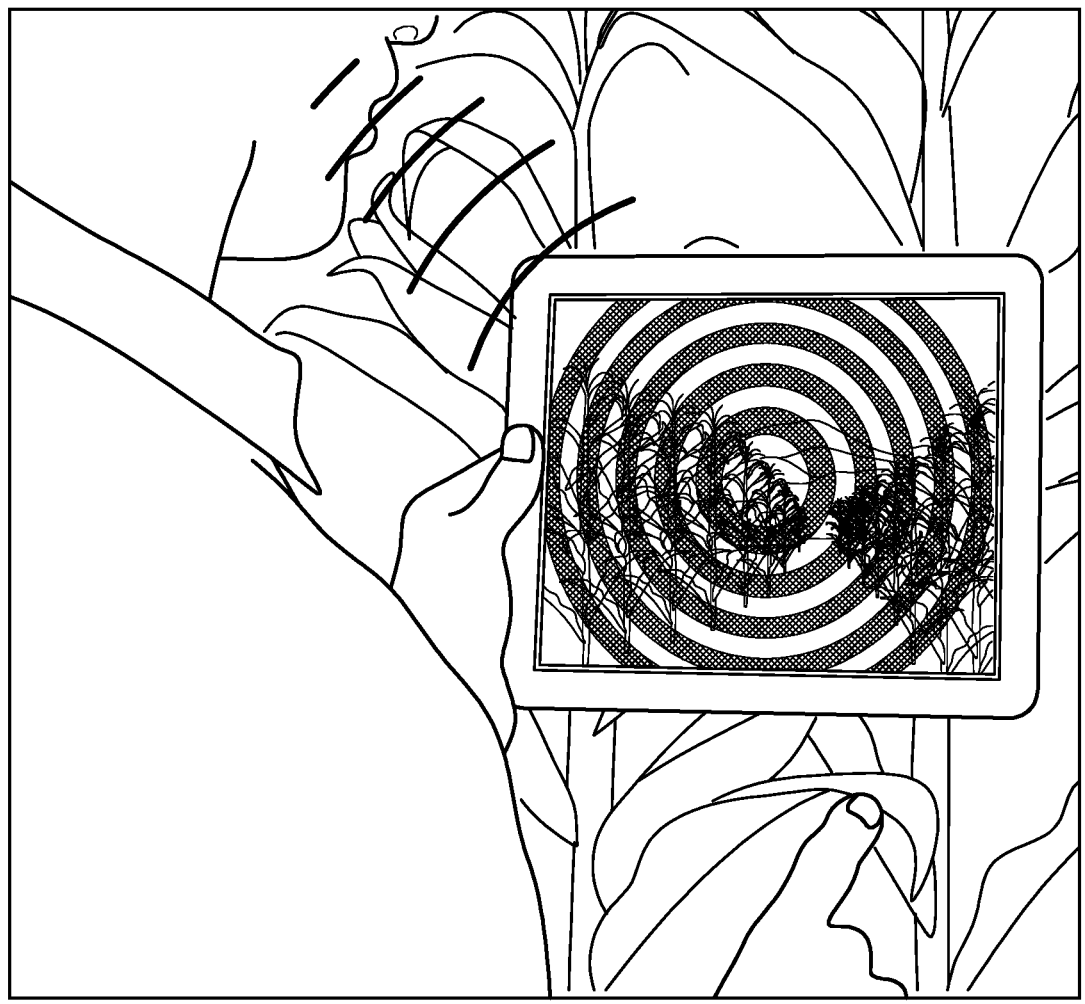
FIG. 21 shows a tactile display configured as a directional speaker that projects sound to the user's ears, in accordance with an embodiment of the present invention.

The conversion engine translates the tactile form into a set of electrical signals (e.g., AC signals), such that each electrical signal corresponds to a pixel of the set of pixels. For each image, the conversion engine codes the tactile patterns for the image into the electrical signals, such as by modulating at multiple frequencies, modulating at multiple amplitudes, double modulation (e.g., 2 Hz×250 Hz), etc. The conversion engine transmits 215 (FIG. 2) each electrical signal to the transducer of the micro-transducers array 230 associated with the pixel corresponding to the electrical signal. In embodiments, the transducer is coupled to a transistor and capacitor at the pixel and the transistor passes the electrical signal to the transducer. The transducer generates output (vibration, pressure, bi-static displacement, etc.) 235, detectable by the fingertip of the human user, for that pixel at a location corresponding to the pixel. In some embodiments, the system 200 also includes an audio circuit. In these embodiments, the conversion engine also transmits each electrical signal to the audio circuit, which generates tone(s), speech (e.g., as a directional speaker, such as shown in FIG. 21, for example implemented by a phased speaker array), or other suitable output corresponding to the output. Surround sound 2.x or higher can be used to provide directional queues to the listener. (Surround sound 2.x is stereo, surround sound 4.x has four sound source locations, etc.).

In some embodiments, to conserve power, each transducer of the micro-transducers array 230 is initially deactivated. Optionally, each transducer is configured with a pressure switch that detects touch by the fingertip of the user at the pixel. In response to the pressure switch detecting the touch, the pressure switch activates the transducer to generate output for its corresponding pixel. The transducer may be again deactivated, if the user's fingertip does not touch the corresponding pixel for a predefined or configurable period of time.

In some embodiments, the system 200 (FIG. 2) also provides a touch sensitive user input device, such that the user can zoom, swipe, or select, via touch, locations (e.g., virtual buttons) on the tactile display to provide input or request information with respect to image and/or text presented at the locations. In these embodiments, each transducer of the micro-transducers array 230 is configured to detect a touch level at a pixel (i.e., force exerted on the pixel, distance the pixel is depressed or capacitance of a touching human digit). For example, depressing a pixel may bring closer together two electrodes, thereby changing electrical capacitance of the electrodes. In some embodiments the pixel may be connected to a circuit that measures the capacitance. In other embodiments, a capacitor is used as part of an oscillator and produces a frequency output (e.g., as an output from an LC or RC relaxation oscillator), said frequency easily converted to a digital signal or measured for processing the location and pressure of fingertips. A transducer of the micro-transducer array 230 may detect the capacitance level at its corresponding pixel, such as resulting from the depression of the pixel. In these embodiments, the system 200 also includes a differential readout circuit configured to compare the touch level at a given pixel to (i) the touch level at adjacent pixels or (ii) a threshold value to determine if the user has selected the location of the given pixel on the display. For example, a differential capacitance readout circuit may compare the capacitance level of a given pixel to (i) the capacitance level of adjacent pixels or (ii) a threshold value to determine if the user has selected the location of the given pixel on the display. If the differential readout circuit determines that the user selected the location of the given pixel, the selection is transmitted to the microprocessor for processing (e.g., generating a response to the selection that can be communicated to the user via the corresponding transducer).

Figure 8:
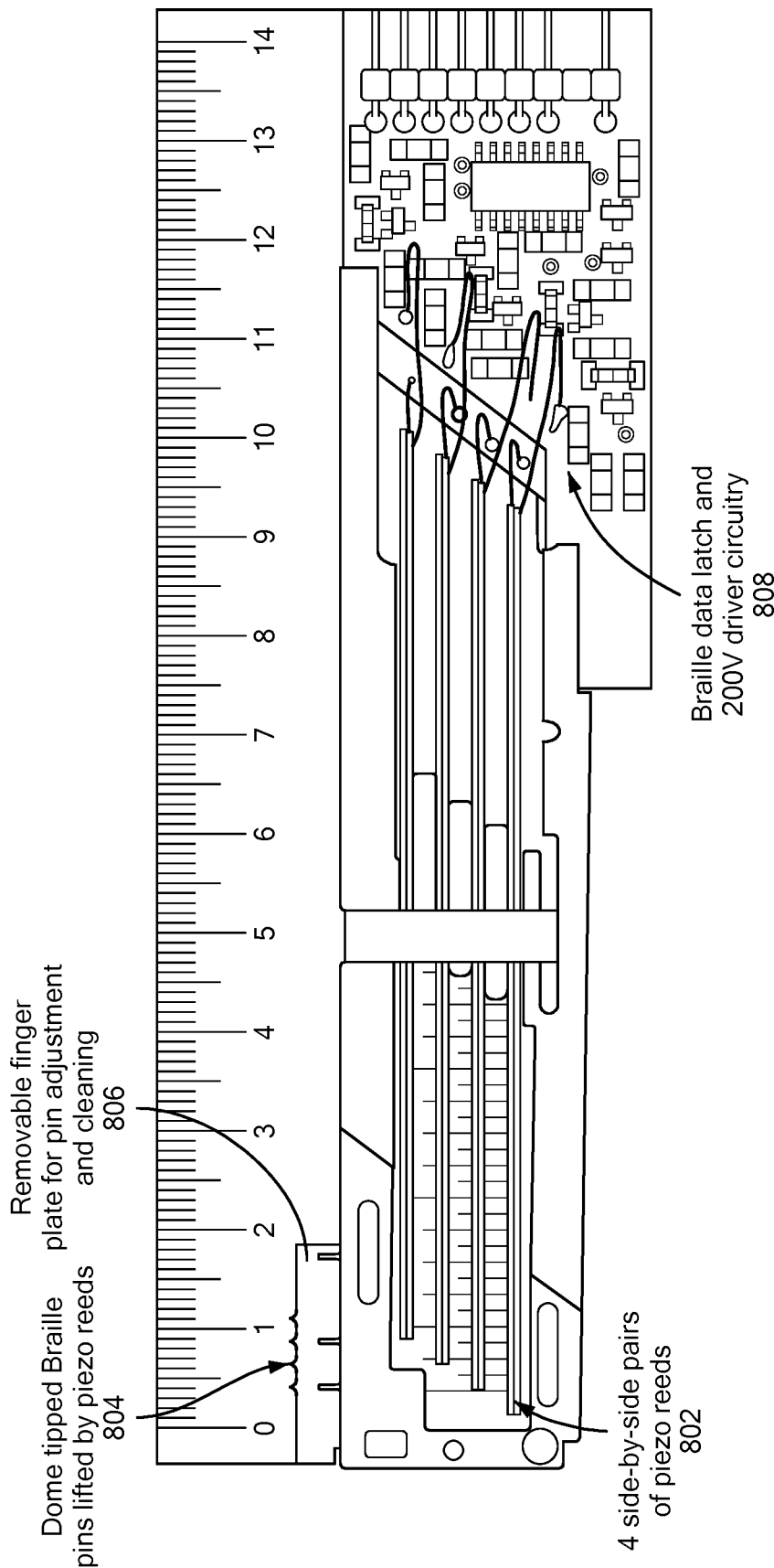
FIG. 8 shows a piezoelectric Bimorph array typically used in Braille readers, according to prior art.

Currently there are no refreshable tactile displays capable of communicating high resolution images and text (only low resolution Braille displays). In the current low resolution tactile (Braille) displays, each pixel of the display is actuated by a large, hand assembled piezoelectric transducer. The density of these pixels is limited to at least 2.5 mm spacing, although the spatial resolution of the human finger's sensitivity is about 1 mm. In addition, high voltages are needed to drive these pixels, making actuation of these current tactile (Braille) displays expensive. For example, one row of 16 Braille characters may cost $2000, an array of 24×16 pins on a 3 mm spacing may cost $10,000, and an array of 60×120 dots (7200 dots) may cost $56,000 (beyond the reach of most vision-impaired individuals). FIG. 8 shows example components of such an existing low resolution Braille display, which technology has remained almost unchanged for over 55 years.

FIG. 8 shows a piezoelectric Bimorph array typically used in Braille readers, according to the prior art. Bimorph arrays lift Braille bumps that are sensed by the finger of a human user. As shown in FIG. 8, a Bimorph array includes side-by-side pairs of piezo reeds 802 that are mechanically coupled to dome tipped Braille pins 804 configured to be lifted by the reeds. The pins extend through a removable finger plate 806, which can be configured to adjust and clean the pins. The reeds are also electrically coupled to a Braille data latch and 200 V driver circuitry 808.

Embodiments of the present invention use MEMS technology to provide low resolution tactile displays that can communicate text and images. The Bimorph of FIG. 8, which is about 3 inches long, is too large for use in making dense MEMS transducers arrays of the present invention.

Previous attempts to produce MEMS Braille displays had limited success due to the difficulty of generating high force and sufficient displacement with a MEMS actuator. A large area affordable tactile display has been the "holy grail" of the Braille community for many decades. Previous attempts included: zirconate titanate (PZT) extender and MEMS motion amplifier, electroactive polymers (EAPs), pumps and micro-valve arrays, rolled polyvinylidene fluoride or polyvinylidene difluoride (PVDF) film, and lead-zirconate-titanate (PZT) actuators with hydraulic amplification. However, these attempts all had deficiencies that prevented them from being produced and commercialized.

Embodiments of the present invention use less expensive MEMS technologies that miniaturize the pixels and make them manufacturable in dense transducer arrays, as shown in FIGS. 9-18 and 27-31 with sufficient resolution (as high as can be sensed by fingertips, approximately 1 mm). Such arrays require low power, a simple fabrication process, and can be manufactured at low cost. Such arrays are also of a length, width and thickness that may be used to produce tactile displays that fit a cell phone screen, tablet computer screen, etc. In some embodiments, the transducer arrays are formed with thin-film transistors that are typically used to drive liquid crystal pixels and use a cross-bar layout with a single transistor and capacitor at each pixel for processing an electrical signal. The transistor passes the electrical (e.g., AC) signal to a corresponding transducer, which causes the pixel to vibrate or pulse, to bi-statically displace or deflect (up or down) the pixel. Bi-static displacement requires 0.5 mm displacement and about 0.15 N force to be sensed by the user's fingertip. However, fingertips are more sensitive to vibration, such that vibratory motion with an amplitude as small as 1 μm can be sensed by the user's fingertip. Such MEMS technologies may be used as the micro-transducer array in FIG. 2 to generate tactile outputs to the fingertip of a human user.

FIG. 9 shows a moving-coil array 900 of an electromagnetic actuator with fixed magnets and moving coils, used in some embodiments of the system of FIG. 2 to generate tactile output to a user.

In FIG. 9, the moving-coil actuator array 900 includes a checkerboard magnet array, a portion of which is shown at 914 and 924, that is stationary, and the coils, exemplified by coils 912 and 922, that vibrate above the magnets of the array, supported by springs or a membrane. FIG. 9 shows two pixels of the moving-coil actuator array 900. The use of the checkerboard magnet array 900 is extremely efficient for creating high magnetic field gradients, which create strong push or pull forces on the coils. In this array 900, multiple layers of many turns of coils can be plated, yielding sufficient force to be sensed at low current and power.

The portion (several pixels) of the electromagnetic actuator array 900 in FIG. 9 includes two electromagnetic moving-coil actuators 910 and 920. Each actuator 910, 912 corresponds to a respective pixel of the tactile display and generates vibration at that pixel. The first actuator 910 contains a plated coil 912 (e.g., high-aspect-ratio SU8 resist/Cu plated coil) and a permanent magnet (PM) 914 (e.g., NdFeB PM) positioned below the coil 912. The coil 912 is driven to move (vibrate) the pixel in response to current of an electrical input signal (e.g., AC signal). To reduce power, the actuator 910 may drive the pixel to vibrate at a frequency of maximum sensitivity to the fingertip (e.g., approximately 250 Hz). The first actuator 910 also includes a MEMS pressure switch 916, which activates current to flow to the first actuator 910 in response to finger pressure on the actuator 910. In this way, the pressure switch 916 reduces power consumption by the first actuator 910, as the coil 912 and/or magnet 914 are only activated to drive vibration when a finger is present to sense the vibration.

Similarly, the second actuator 920 contains a plated coil 922 (e.g., high-aspect-ratio SU8 resist/Cu plated coil) and a permanent magnet 924 (e.g., NdFeB PM) positioned below the coil 922. The coil 922 is driven to move (vibrate) the pixel in response to current of an electrical input signal. The second actuator 920 also includes a MEMS pressure switch 926, which activates current to flow to the second actuator 920 in response to finger pressure on the actuator 920.

The electromagnetic actuator array 900 is covered by, and mechanically coupled to, a cover sheet (not shown in FIG. 9, but shown in FIG. 2). The cover sheet may be made of a sheet of plastic, stretched polymer, and other such materials. The coils 912, 922 may be attached to or embedded in the coversheet or may be supported by a flexible layer or springs (not shown). These springs may be buckled and have two stable positions, up and down, which results in bistability. The electromagnetic actuator array 900 is also coupled to one or more layers 930 of soft magnetic materials (e.g., FeNi) that concentrates flux.

FIG. 10 shows a pixel 1010 in a moving-magnet actuator array of an actuator with a fixed coil and a vibrating magnet, used in some embodiments of the system of FIG. 2 to generate tactile output to a user. In FIG. 10, the pixel of the moving-magnet actuator array has a coil 1012 that is stationary, and a permanent magnet 1014 which vibrates above the coil 1012. Additional layers containing soft magnetic materials (not shown) above and below the permanent magnet can be used to create bistability, as the permanent magnet is attracted to the soft magnetic materials at the upper and lower extent of travel. FIG. 10 shows that the electromagnetic actuator (pixel) 1010 of an electromagnetic actuator array can be made quite small, although pixels of other (larger and smaller) dimensions are contemplated. The actuator's permanent magnet 1014 may have a diameter of about 1 mm and a thickness of about 0.4 mm. The actuator's coil 1012 may have a height of about 100 µm, a diameter of about 1.5 mm, a pitch of about 20 µm, and may include about 25 turns within the actuator 1010. The other electromagnetic actuators of the electromagnetic actuator array have the same or similar size as actuator 1010 of FIG. 10.

FIG. 11 shows a magnet array 1150 contained in the electromagnetic actuator array of FIG. 9, according to embodiments of the present invention. The magnet array 1150 includes the permanent magnet of each actuator in the electromagnetic actuator array 900 of FIG. 9. For example, the magnet array 1150 includes the magnet 914 of the first actuator 910 and the magnet 924 of the second actuator 920 of FIG. 9. The magnets of the magnet array 1150 are arranged in a checkerboard pattern of alternating north and south poles, which creates a high field gradient for the actuator array 900.

Figure 12A:
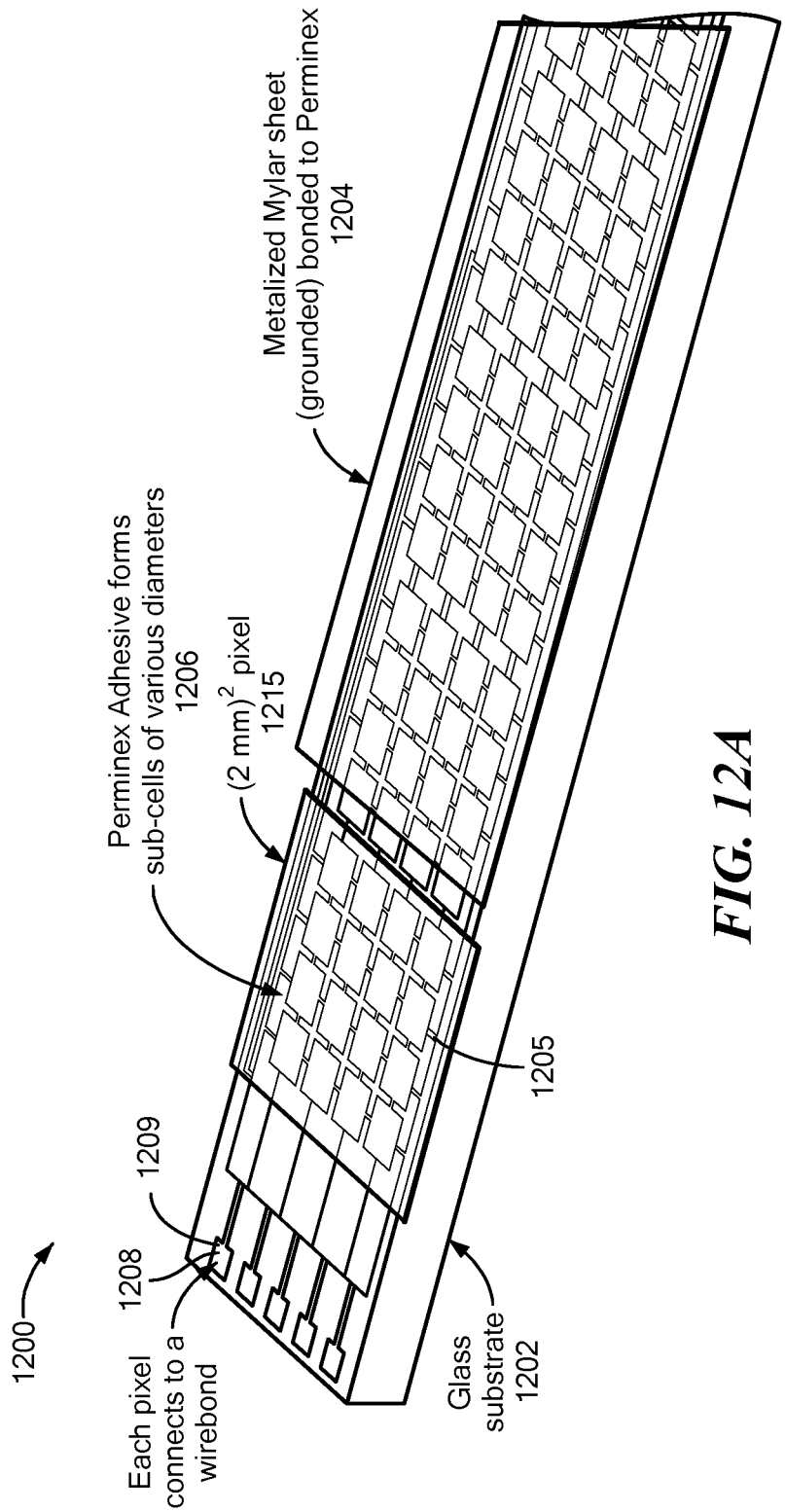
FIG. 12A is a perspective view of a capacitive micro-machined transducer (cMUT) array that may be used in the system of FIG. 2 to generate tactile output on a tactile display, according to embodiments of the present invention.
Figure 13:
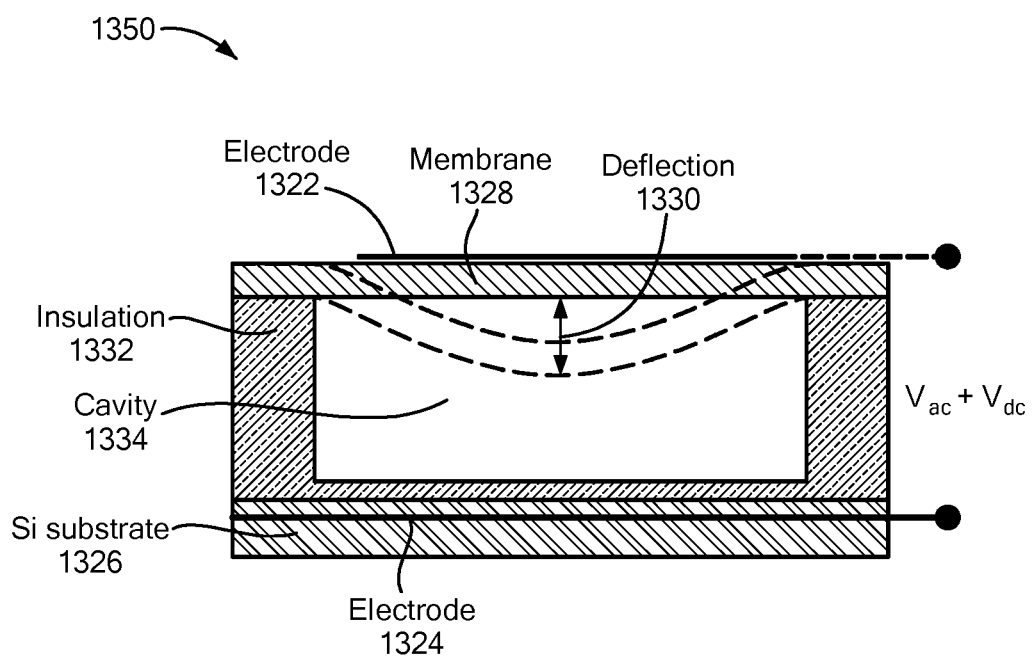
FIG. 13 shows a cross-sectional view of a cMUT pixel of the transducer array of FIG. 12A, according to embodiments of the present invention.

FIG. 12A shows a perspective view of a capacitive micro-machined transducer (cMUT) array 1200 that may be used in the system of FIG. 2 to generate tactile output on a tactile display, according to embodiments of the present invention.

A pixel of a tactile display needs to produce a displacement of at least about 5-10 microns and a force of at least about 20 milli-Newtons, in contact with the fingertip, to be detectable by a human. The prior art has not provided an easily manufacturable, inexpensive display that can meet these criteria. The cMUT array 1200 of FIG. 12A is capable of producing the necessary force and displacement to meet these criteria, and it can be produced as a large array at very low cost.

The cMUT array 1200 of FIG. 12A includes a glass, silicon, ceramic or polymer substrate 1202, which may be patterned with metal film by metal liftoff (e.g., Cr 500A/A1 5000A). The glass substrate and patterned metal film may be coated with plasma enhanced chemical vapor deposited (PECVD) oxide (e.g., PECVD $SiO_2$) to prevent short circuits. A suitable metalized and grounded sheet, such as biaxially-oriented polyethylene terephthalate (BoPET) polyester film, such as Mylar film, 1204 is bonded to the surface of the substrate to create the cMUT array 1200. Each cMUT cell, exemplified by cMUT cell 1205, of the cMUT array 1200 corresponds to a pixel 1215. In the embodiment of FIG. 12A, a suitable adhesive (e.g., PermiNex® negative resist) is used for coating and forming sub-cells 1206 of various dimensions. In other embodiments, recesses are etched on each cMUT in sub-cell patterns 1206, such that the recesses leave bumps to support the BoPET. Bondpads, exemplified by bondpad 1209, are opened by etching through the PECVD oxide insulator coating the metal layer, which is connected to each cMUT. Each pixel connects to a wirebond, exemplified by wirebond 1208, of a respective bondpad 1209. The wirebond 1208 may be coated with a suitable insulating glob-top compound to protect the wirebonds 1208 from touch, and to protect fingers from exposed voltages. Transparency may be achieved by substituting transparent conductive layers for the examples cited, such as indium-tin-oxide (ITO) or doped zinc oxide for aluminum.

Signals are transmitted to a wirebond 1208 and produce acoustic waves at the corresponding cMUT, which can be sensed as vibration or bi-static displacement by the fingertips of a human user. In some embodiments, the cMUTs are configured to amplitude modulate the acoustic signals at a frequency (e.g., about 250 Hz) to effectively stimulate the fingertips of the human user. In some embodiments, the acoustic waves are sonic, rather than ultrasonic, and thus, this transducer may be referred to simply as a capacitive micro-machined transducer (cMT). As used herein, the term cMUT refers to a capacitive micro-machined transducer, regardless of operating frequency, i.e., regardless of sonic or ultrasonic operation. In embodiments, the cMUT array 1200 includes a stretched polymer or plastic sheet with a grounded metal layer as part of the cMUT. An additional polymer sheet may be used to ruggedize and protect the cMUT array. The outer polymer sheet may be textured or have bumps corresponding to pixel locations to enhance tactile sensitivity.

Figure 12B:
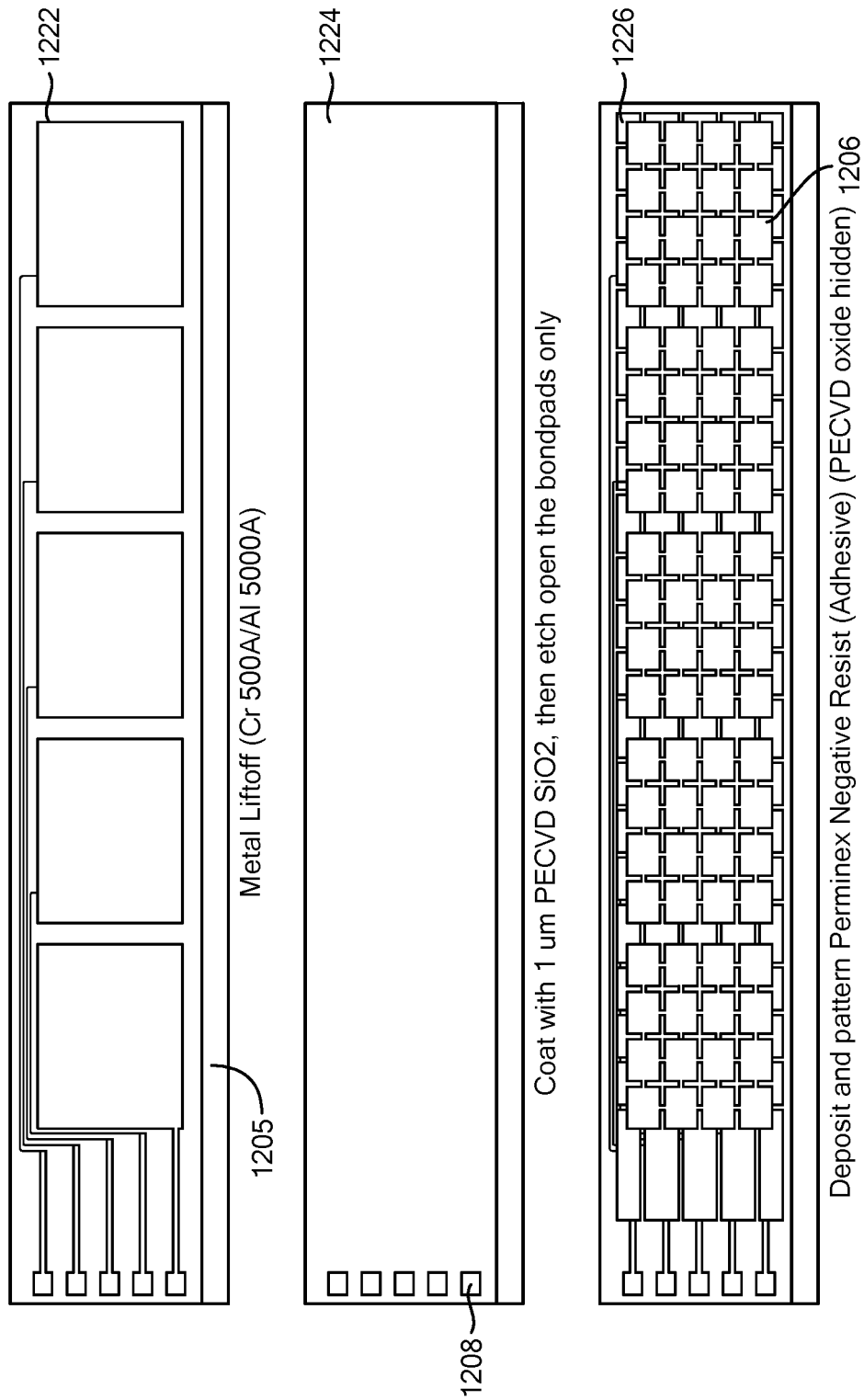
FIG. 12B shows intermediate steps of a fabrication process for building the cMUT of FIG. 12A, according to embodiments of the present invention.

FIG. 12B shows intermediate steps of a fabrication process for building the cMUT of FIG. 12A, according to embodiments of the present invention. In a first step 1222, the substrate 1205 is patterned with metal film by metal liftoff (e.g., Cr 500A/Al 5000 A). In a second step 1224, the substrate 1205 is coated with a 1 μm plasma enhanced chemical vapor deposited (PECVD) oxide (e.g., PECVD $SiO_2$) to prevent short circuits and only the bondpads 1208 are etched open. In a third step 1226, the adhesive is deposited on the substrate 1205 and patterned to form the sub-cells 1206 (the PECVD oxide is hidden).

FIG. 13 shows a cross-sectional view of the cMUT pixel of the transducer array of FIG. 12A, according to embodiments of the present invention. The embodiment of FIG. 13 includes a silicon substrate 1326 with a first electrode (biased to voltage $V_{ac}+V_{dc}$) 1322 coupled to the substrate 1326. The substrate 1326 lies under a cavity 1334 with a layer of insulation 1332 between the substrate 1326 and the cavity 1334. A thin membrane 1328 (e.g., made of a flexible material, e.g. polymer) is positioned over the cavity 1334. The thin membrane 1328 comprises a second electrode (typically grounded for safety) 1324 which may be on the inside (lower) or outside (upper) surface, or both sides.

When an electric signal is applied to the cMUT 1350, it creates a force resulting in the deflection 1330 of the membrane 1328. In embodiments of the present invention, the cMUT operates such that the vibration of the deflected membrane generates continuous or pulsed acoustic waves at the corresponding pixel at a frequency (e.g., about 250 Hz) that can be sensed by the fingertip of the human user. The membrane may also detect acoustic waves. In other embodiments, the cMUT may include any other combination of materials known to one skilled in the art used to produce cMUTs. In some embodiments, the acoustic waves are sonic, not ultrasonic, and thus, this transducer may be referred to simply as a capacitive micro-machined transducer (cMT). As used herein, the term cMUT refers to a capacitive micro-machined transducer, regardless of operating frequency, i.e., regardless of sonic or ultrasonic operation.

FIGS. 14A-14E show different configurations of the cMUT device (capacitive transducer), according to respective embodiments of the present invention.

FIG. 14A shows a cMUT device that is configured (in order from bottom to top) with a substrate 1412, a lower conductive electrode (bottom conductor layer) 1410, an insulator layer 1408, a spacer layer 1406 to establish an air-gap, an upper conductive electrode (top conductor layer) 1404, and a flexible membrane layer 1402 with a metal layer on the bottom surface.

FIG. 14B shows a cMUT device that is configured (in order from bottom to top) with a substrate 1412, a lower conductive electrode (bottom conductor layer) 1410, a spacer layer 1406 to establish an air-gap, a dielectric membrane with an upper conductive electrode (top conductor layer) 1414. In general, at least one insulating layer may be used in the gap to prevent short circuits.

An electret is an insulating layer with permanent charge stored in it. The electret layer in the gap (spacer layer) of a capacitive transducer induces mirror charges on the opposing electrode and creates an electric field in the gap. Such a field can reduce the necessary drive voltage to be applied when used as an actuator. Commonly used in electret microphones, the electret layer makes unnecessary an additional bias voltage across the sense gap. The electret layer can be charged by corona discharge, electron beam, or other techniques known to one skilled in the art of electret formation. Many polymers can be made into electrets, with many fluoropolymers (e.g., Teflon®, FEP, etc.) best known due to their ability to stably hold charge for long periods of time.

FIG. 14C shows a cMUT device that includes an electret layer 1416 atop the lower conductive electrode 1410. The cMUT device of FIG. 14C is configured (in order from bottom to top) with a substrate 1412, a lower conductive electrode (bottom conductor layer) 1410, an electret layer 1416, a spacer layer 1406 to establish an air-gap, an upper conductive electrode (top conductor layer) 1404, and a flexible membrane layer 1402 with a metal layer on the bottom surface. In embodiments, the electret layer 1416 is applied over the lower electrode 1410. Charge in the electret layer 1416 induces an opposite polarity charge in the opposing electrode 1404, and an electric field in the gap.

FIG. 14D shows a cMUT device that includes an electret layer as part of the membrane layer. The cMUT device of FIG. 14D is configured (in order from bottom to top) with a substrate 1412, a lower conductive electrode (bottom conductor layer) 1410, a spacer layer 1406 to establish an air-gap, a flexible membrane electret 1422, and an upper conductive electrode (top conductor layer) 1404. In the embodiment of FIG. 14D, the cMUT's flexible membrane 1422 itself is an electret.

Figure 14E:
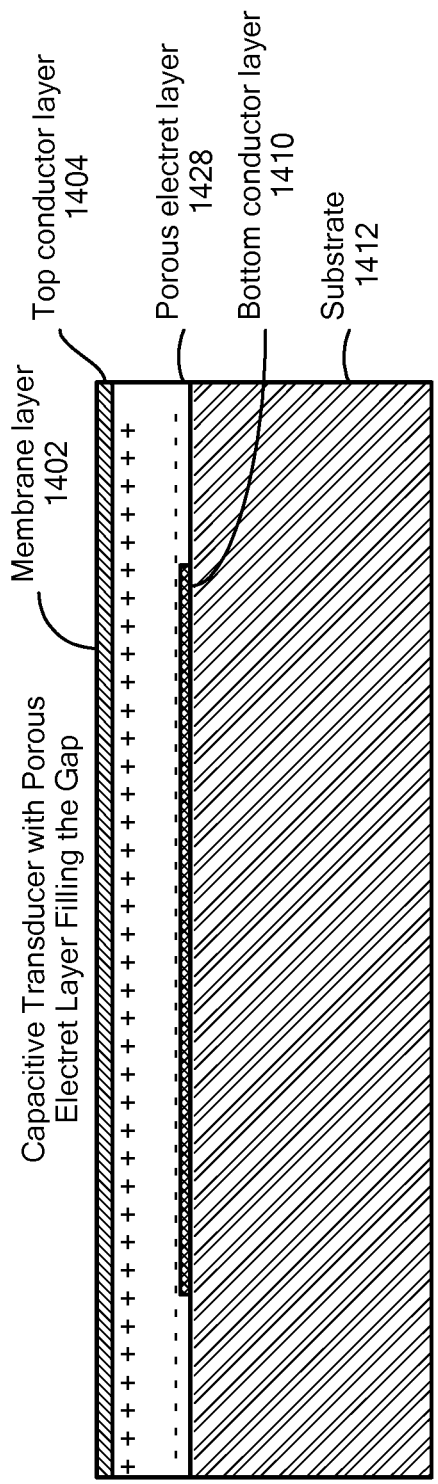

FIG. 14E shows a cMUT device with a porous electret layer filing the gap in the cMUT's layers. The cMUT device of FIG. 14E is configured (in order from bottom to top) with a substrate 1412, a lower conductive electrode (bottom conductor layer) 1410, a porous electret layer 1428, an upper conductive electrode (top conductor layer) 1404, and a flexible membrane layer 1402.

In the embodiment of FIG. 14E, a porous electret layer 1428 of porous polymer fills the gap between the electrode layers 1404, 1410. In some embodiments, this porous polymer may be corona charged, with opposing charges of the electrode layers 1404, 1410 on opposite sides of the internal pores. The porous polymer has a high mechanical compliance which is advantageous, while the internal charge polarization makes it act like a piezoelectric material, either as a sensor or actuator. Example electrets of polymer fills are further described in "Voided cyclo-olefin polymer films: ferroelectrets with high thermal stability," M. Wegener, et al., 12th International Symposium on Electrets, Salvador, pp. 47-50 (2005), which is herein incorporated by reference in its entirety.

Figures 15A, 15B:
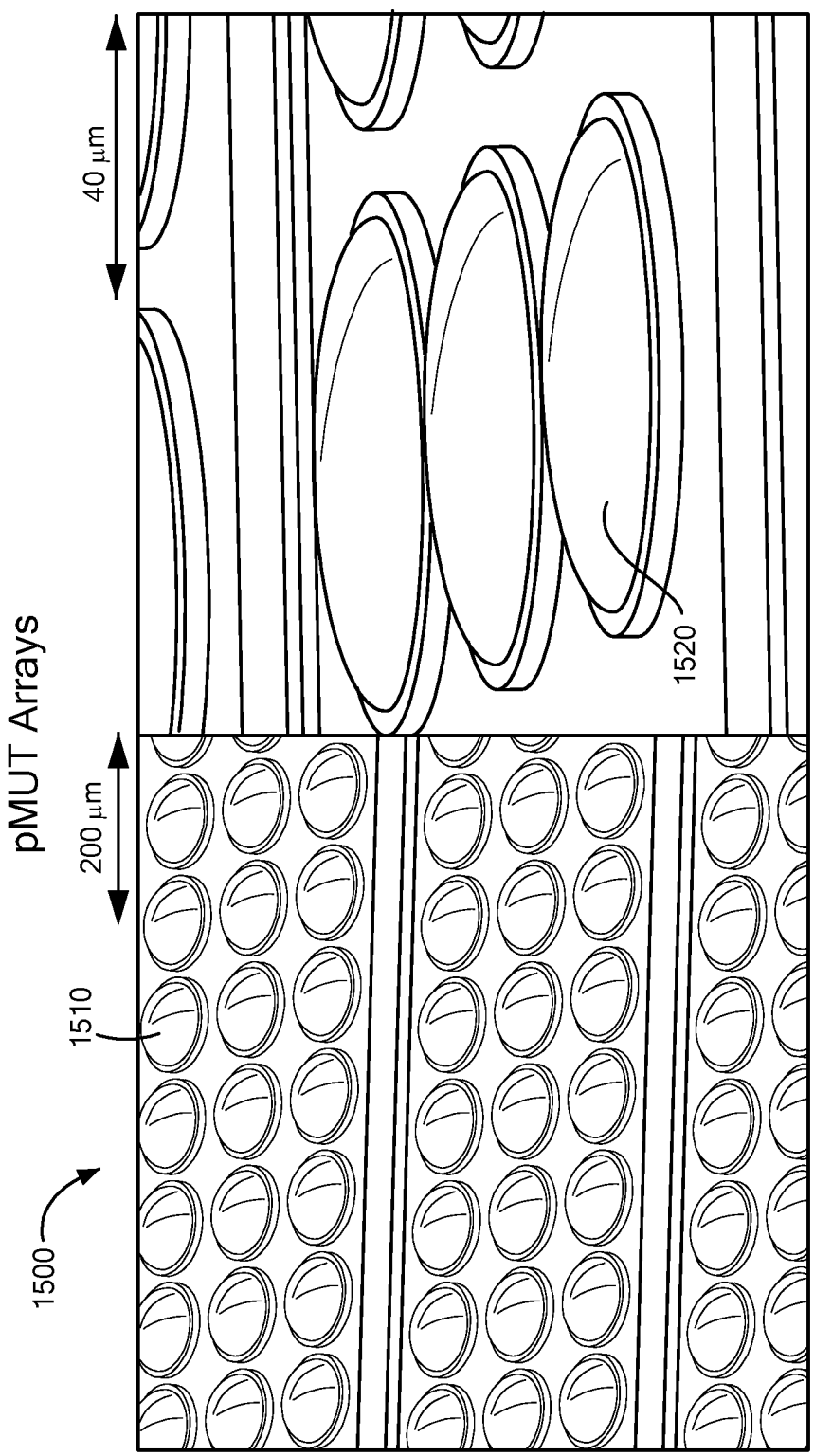
FIG. 15A shows a top view of a dome-shaped piezoelectric micro-machined transducer (pMUT) array that may be used in the system of FIG. 2 to generate tactile output on a tactile display, according to embodiments of the present invention.
FIG. 15B shows a perspective view of a dome-shaped pMUT array, according to an embodiment of the present invention.

FIG. 15A is a top view of a dome-shaped piezoelectric micro-machined transducer (pMUT) array that may be used in the system of FIG. 2 to generate tactile output on a tactile display, according to embodiments of the present invention. The dome-shaped pMUTs of the pMUT array 1500 are arranged in channels 1510. Each dome-shaped pMUT in a channel is produced to correspond to a pixel of the tactile display. FIG. 15B shows a magnified perspective view of pMUT array 1500, according to an embodiment of the present invention, which shows the form of the flextensional dome-shaped pMUTs, such as pMUT 1520. In response to an electrical signal to one of the pMUTs, the pMUT deflects, causing high pressure acoustic waves at the corresponding pixel that can be sensed as vibration or bi-static displacement by the fingertips of a human user. In the embodiment, the pMUTs are configured to amplitude modulate the acoustic signals at a frequency (e.g., about 250 Hz) to effectively stimulate the fingertips of the human user. In embodiments, the pMUT array 1500 may be positioned under a stretched polymer or plastic sheet to ruggedize and protect the pMUT array.

Figure 16:
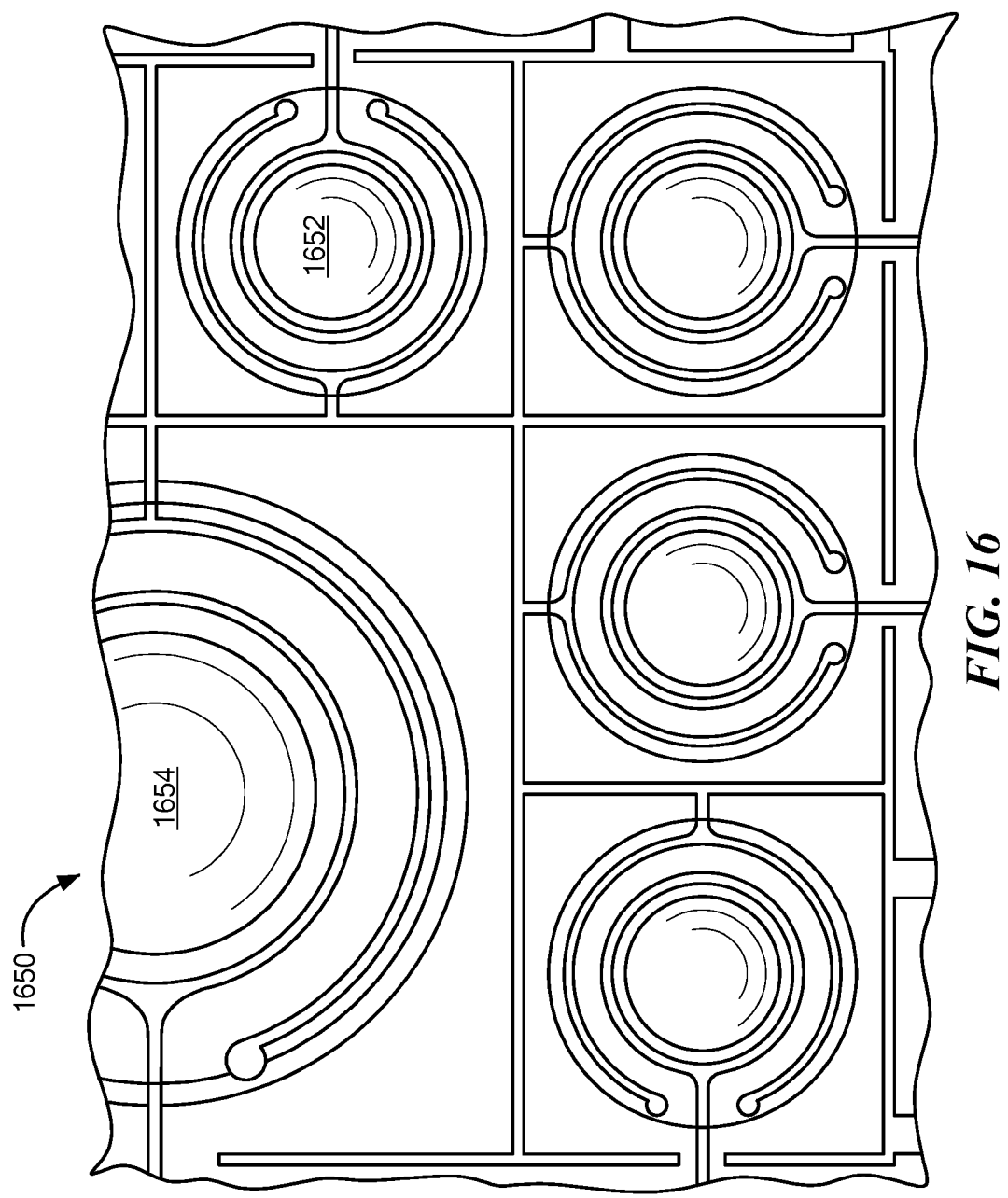
FIG. 16 shows an image of a monomorph pMUT array that may be used in the system of FIG. 2 to generate tactile output on a tactile display, according to embodiments of the present invention.

FIG. 16 shows a top view of a monomorph pMUT array that may be used in the system of FIG. 2 to generate tactile output on a tactile display, according to embodiments of the present invention. In contrast to the planer pMUTs of FIGS.

17, the monomorph pMUTs of FIGS. 15 and 16 are dome-shaped. Each monomorph pMUT of the monomorph pMUT array 1650 corresponds to a pixel of the tactile display. In response to an electrical signal to one of the pMUTs, the pMUT deflects, causing acoustic waves at the corresponding pixel that can be sensed as vibration or bi-static displacement by the fingertip of a human user. In the embodiment, the pMUTs are configured to amplitude modulate the acoustic signals at a frequency (e.g., 250 Hz) to effectively stimulate the fingertips of the human user. In embodiments, the pMUT array 1650 is positioned under a stretched polymer or plastic sheet.

In FIG. 16, two different sized pMUT transducers are shown. One sized pMUT transducer 1652 is about 150 um diameter and the other sized pMUT transducer 1654 is about 300 um diameter, however other diameters (larger and smaller) are contemplated. Each pMUT transducer shown is a circular membrane with two concentric metal electrodes on top of a ferroelectric PZT layer and other layers.

Figure 17:
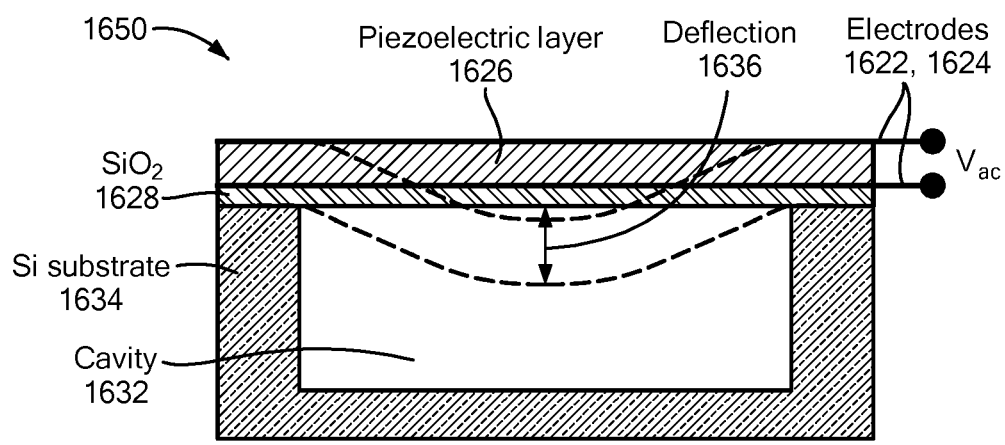
FIG. 17 shows a cross-sectional view of a pMUT in a pMUT array that may be used in the system of FIG. 2, according to an embodiment of the present invention.

FIG. 17 shows a cross-sectional view of a planar pMUT 1650 in a pMUT array, in accordance with an embodiment of the present invention. In the embodiment of FIG. 17, the planar pMUT includes a thin membrane 1628 made of silicon dioxide ($SiO_2$). In other embodiments, the thin membrane 1628 may be made of silicon nitride, polysilicon, or another suitable material. The thin membrane 1628 is positioned over a silicon (Si) substrate 1634 surrounding a cavity 1632 formed in a size and shape that allow oscillation of the membrane 1628. The thin membrane 1628 is coupled with a thin piezoelectric film layer 1626 made of lead zirconate titanate (PZT) or its variants, aluminum nitride (AlN), AScN, polyvinylidene fluoride (PVDF), or such. The piezoelectric film layer is situated between a top electrode layer (driven with a voltage $V_{ac}$) 1622 and a bottom electrode layer 1624.

When an electrical field is applied across the piezoelectric film layer 1626, the electric field creates a transverse stress and a bending moment resulting in the deflection 1636 of the membrane 1628. In embodiments of the present invention, the pMUT operates such that the vibration of the deflected membrane generates a continuous or pulsed acoustic waves at the corresponding pixel in a frequency (e.g., 250 Hz) that can be sensed by the fingertip of the human user. The membrane may also detect acoustic waves. In other embodiments, the pMUT may be composed of any other combination of materials known to one skilled in the art used to produce pMUTs. In some embodiments, the acoustic waves are sonic, rather than ultrasonic, and thus, this transducer may be referred to simply as a piezoelectric micro-machined transducer (pMT). As used herein, the term pMUT refers to a piezoelectric micro-machined transducer, regardless of operating frequency, i.e., regardless of sonic or ultrasonic operation.

Figure 18:
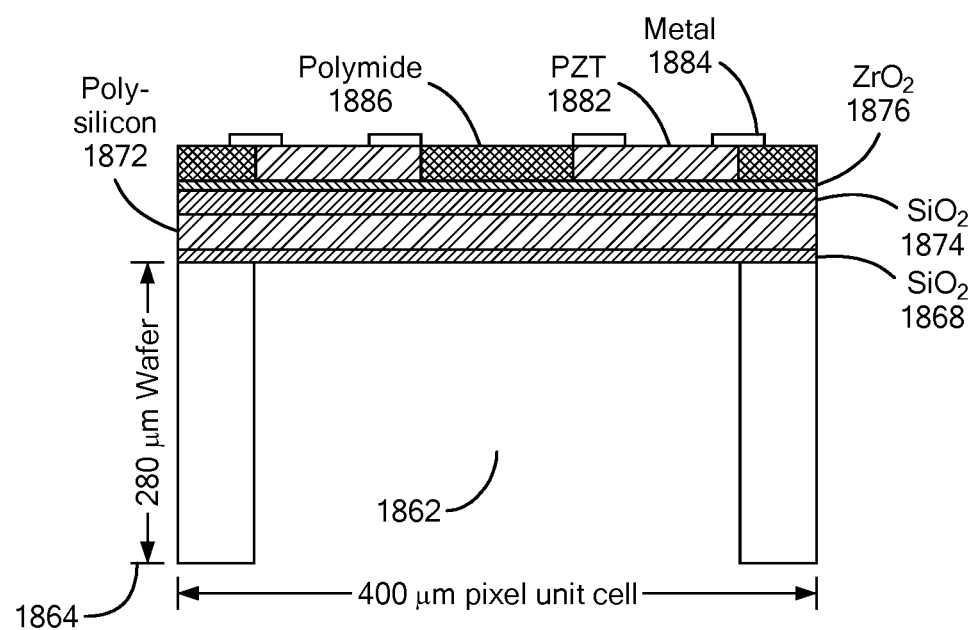
FIG. 18 shows a cross-sectional view of a pMUT in the monomorph pMUT array of FIG. 16, according to embodiments of the present invention.
Figure 19:
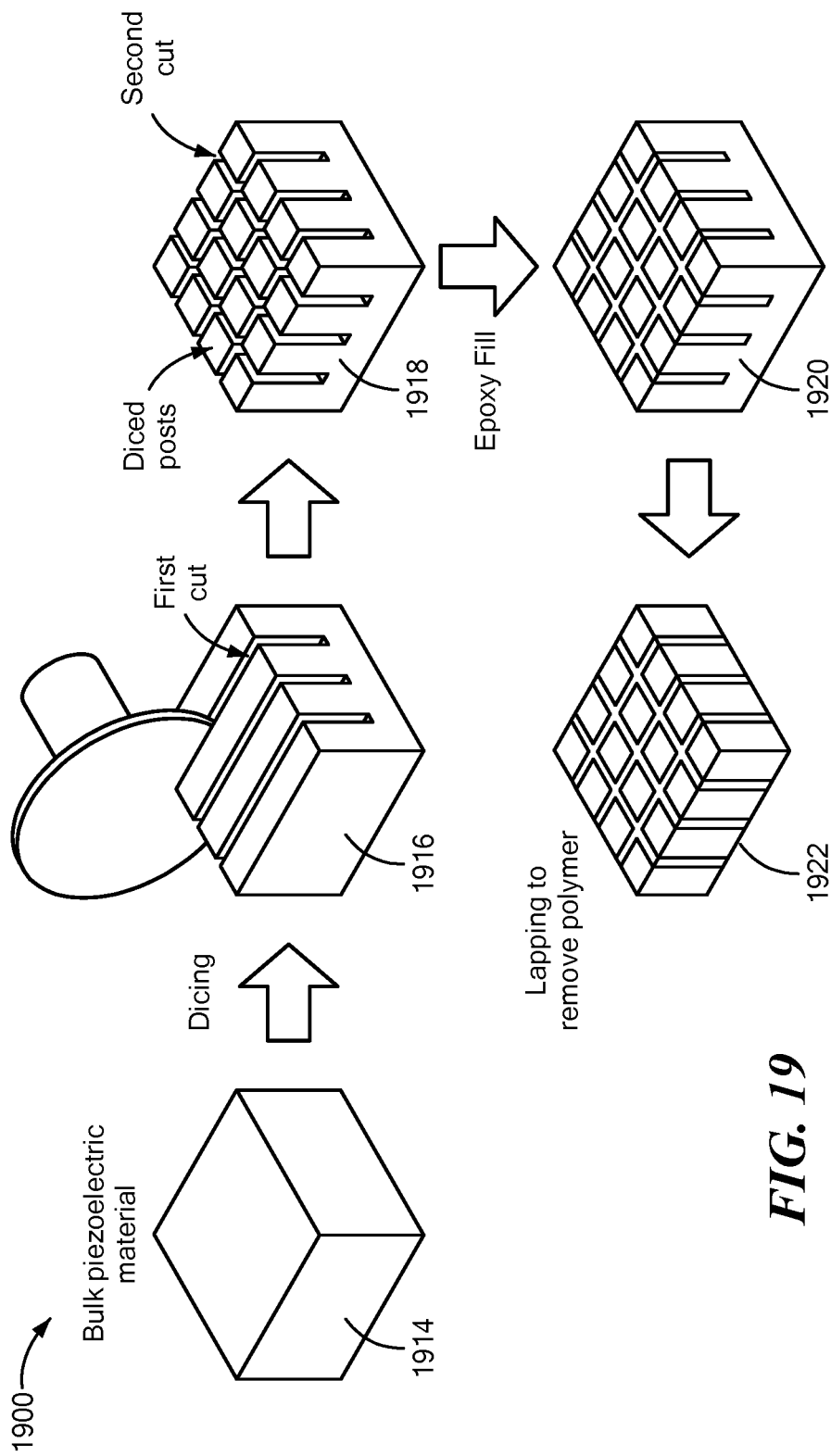
FIG. 19 shows, in a perspective view, several stages of a "dice and fill" manufacturing process for a bulk single element lead zirconate titanate (PZT) transducer array used in the system of FIG. 2 to generate tactile output on a tactile display, according to embodiments of the present invention.

FIG. 18 shows a cross-sectional view of a monomorph pMUT in the pMUT array of FIG. 16. The monomorph pMUT functions similar to the dome-shaped pMUT of FIG. 15A. The monomorph pMUT has two concentric metal ring electrodes to apply an in-plane electric field to the PZT layer. The monomorph pMUT has a thin membrane 1868 made of silicon dioxide ($SiO_2$) and polysilicon 1872. In other embodiments, the thin membrane 1868 may be made of silicon nitride, single crystal silicon, or other suitable material(s). The thin membrane 1868 is positioned over a wafer 1864 surrounding a cavity 1862 formed in a size and shape that allow oscillation of the membrane 1868. The layers on top of the membrane 1868 include a silicon dioxide layer 1874, a zirconium dioxide ($ZrO_2$) layer 1876, a polyimide 1886 and lead zirconate titanate (PZT) 1882 layer, and a patterned metal layer 1884.

When an electric field is applied through the piezoelectric layer, the electric field creates a transverse stress and a bending moment resulting in the deflection of the membrane 1868. In embodiments of the present invention, the pMUT operates such that the vibration of the deflected membrane generates a continuous or pulsed acoustic waves at the corresponding pixel in a frequency (e.g., 250 Hz) that can be sensed by the fingertip of the human user. In other embodiments, the monomorph pMUT may be composed of any other combination of materials known to one skilled in the art to use in producing pMUTs. In some embodiments, the acoustic waves are sonic, not ultrasonic, and thus, this transducer may be referred to simply as a piezoelectric micro-machined transducer (pMT). As used herein, the term pMUT refers to a piezoelectric micro-machined transducer, regardless of operating frequency, i.e., regardless of sonic or ultrasonic operation.

FIG. 19 shows, in a perspective view, several stages of a manufacturing process for a bulk PZT dice and fill transducer array used in the system of FIG. 2 to generate tactile output on a tactile display, according to embodiments of the present invention. Each PZT block produced by the dice and fill process 1900 functions similar to the pMUTs of FIGS. 15-18. Each transducer of the array 1900 corresponds to a pixel of the tactile display. Dice and fill transducer arrays are typically used for medical ultrasound, but at high intensity the ultrasonic waves can be perceived by a fingertip.

As shown in FIG. 19, the dice and fill transducer 1900 is produced by taking a bulk piezoelectric material 1914 (e.g., PZT) and dicing the material by making first cuts in a first direction 1916 and then second cuts in a second direction 1918. The first and second cuts resulting in diced posts of the material 1914. The diced posts are filled 1920 with a polymer material (e.g., epoxy resin) which holds it together and separates the post elements, so as to produce a two-phase composite. In some embodiments, silicone is added to produce a three-phase composite. Lapping 1922 is performed to remove polymer and the un-diced portion of the PZT. Typically each element is driven with an individual electrode on one side, and a ground plane is applied to all the elements on the side facing the environment or patient. An example PZT die and fill with a 1-3 multi-element piezoelectric compositions is described in "Preparation and performance of 1-3 multi-element piezoelectric composites," S. F. Huang et al., Shandong Provincial Key Lab, China (2015), which is herein incorporated by reference in its entirety.

In response to an electrical signal to a transducer of the array 1900, the transducer produces acoustic waves at the corresponding pixel in a frequency (e.g., 250 Hz) that can be sensed as vibration or pressure by the finger of a human user. In other embodiments, the transducers 1900 may be composed of any other combination of materials known to one skilled in the art to use in producing PZT dice and fill transducers. In some embodiments, the acoustic waves are ultrasonic and in other embodiments, they are sonic, not ultrasonic. In other embodiments, PZT 1-3 composites may be used instead of bulk PZT dice and fill transducers in the transducer array. In embodiments, the transducer array is positioned under a stretched polymer or plastic sheet.

In other embodiments, the transducer array may instead be bi-stable MEMS actuators that are stable in both up and down positions, which require energy to switch between states, but which otherwise draw no power.

FIGS. 27-31 show one or more micro-transducers fabricated on a printed circuit (PC) substrate, according to several embodiments of the present invention. These micro-transducers may be arrayed and used in some embodiments of the system 200 of FIG. 2 to generate tactile output to a user.

Figure 27:
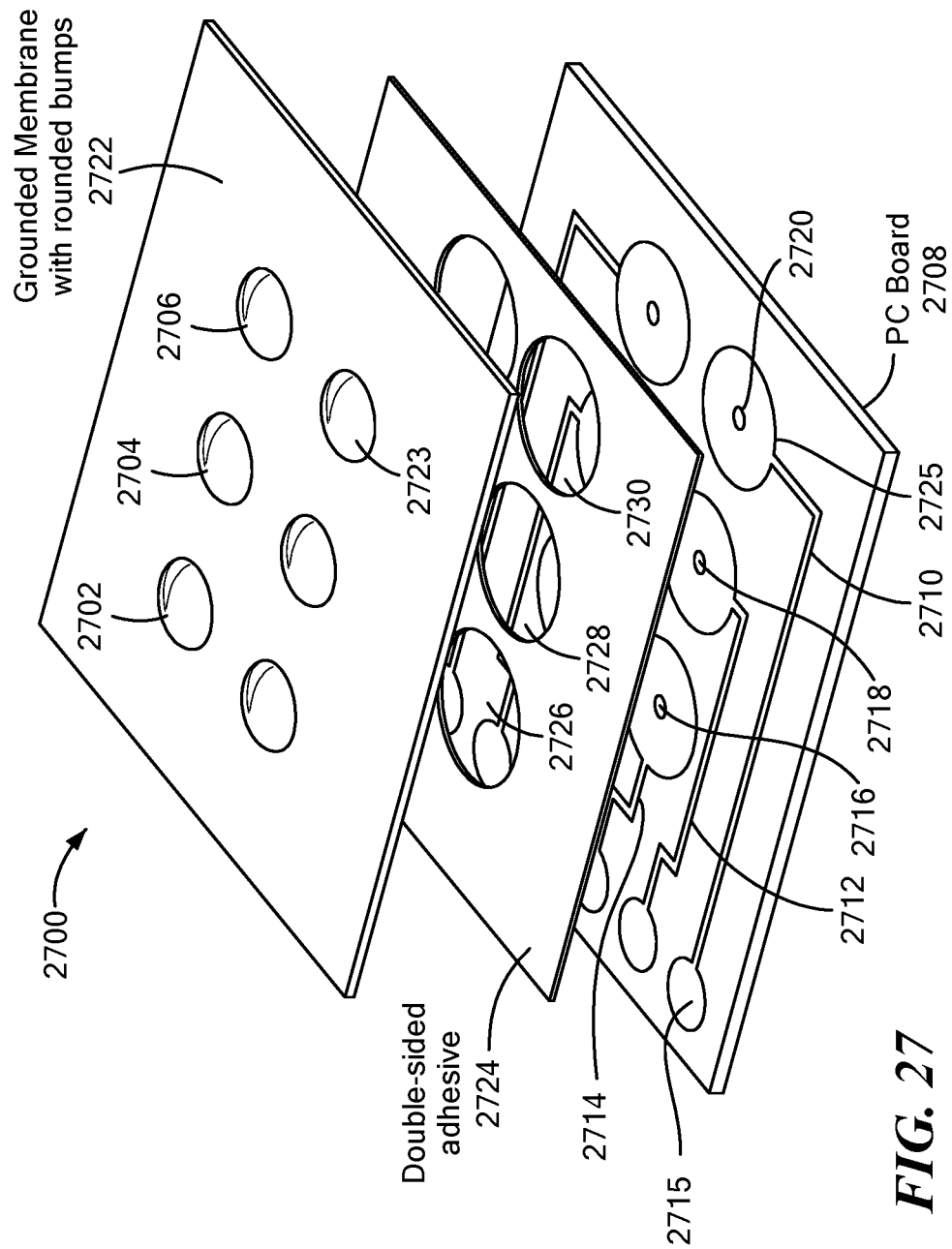
FIGS. 27-31 show one or more micro-transducers fabricated on a printed circuit (PC) substrate, according to several embodiments of the present invention.
Figure 28:
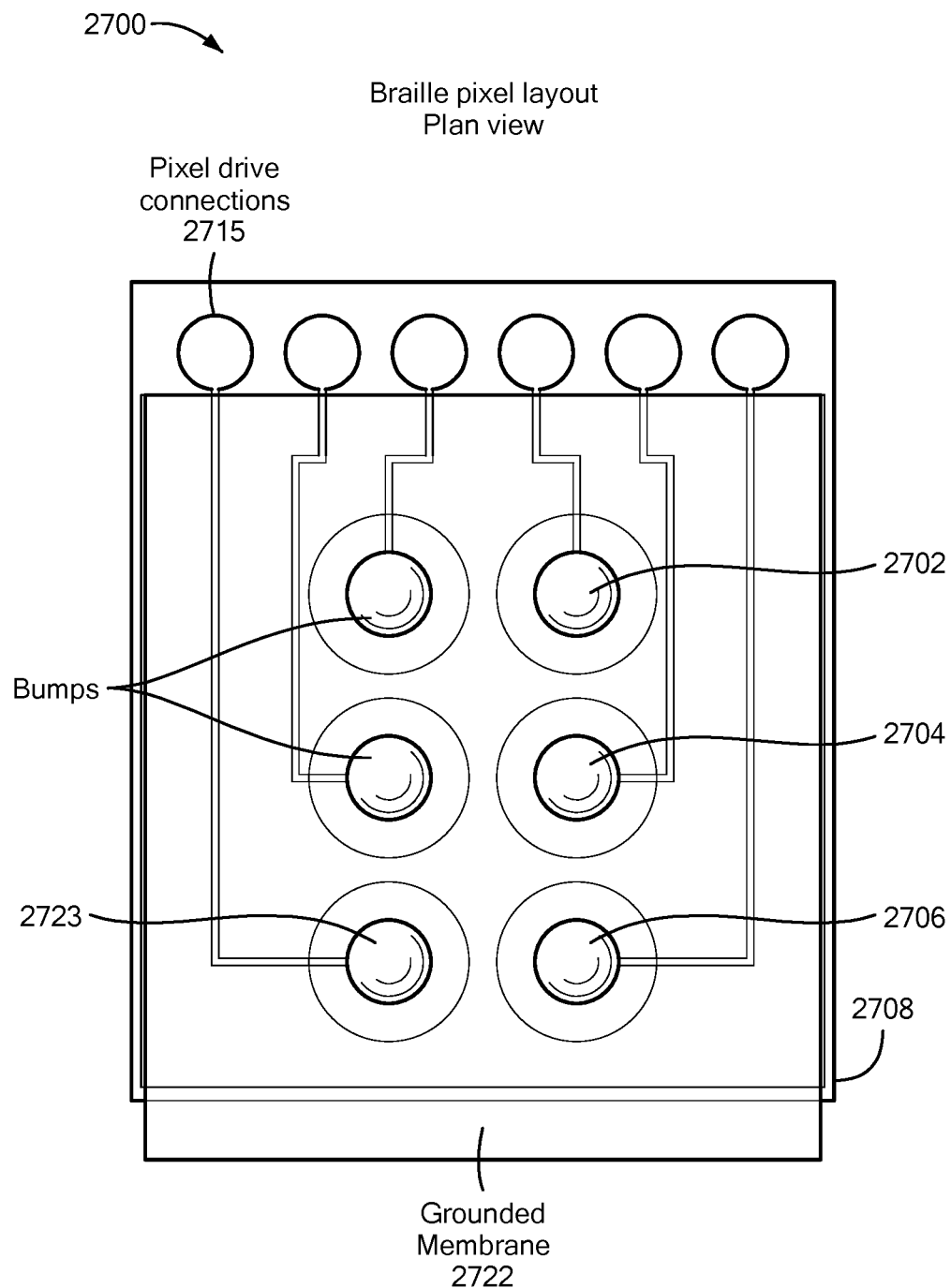

FIG. 27 is a perspective exploded view of a Braille pixel 2700 that includes six individually actuated pixel, exemplified by pixels 2702, 2704 and 2706, fabricated on a printed circuit (PC) board substrate 2708, according to an embodiment of the present invention. FIG. 28 is a top (plan) view of the Braille pixel 2700 of FIG. 27, assembled. As can be seen in FIG. 27, the Braille pixel 2700 is made of six pixels 2702-2706 on a PC board substrate 2708, with electrical interconnects, exemplified by interconnects 2710, 2712 and 2714. The substrate defines a through hole for each pixel 2702-2706, exemplified by through holes 2716, 2718 and 2720.

A resilient membrane 2722 defines a respective rounded bump, exemplified by bump 2723, for each pixel 2702-2706. The bumps 2723 register above corresponding electrically conductive traces, such as copper traces, exemplified by trace 2725, on the substrate 2708. An adhesive layer 2724 adheres the membrane 2722 to the substrate 2708, while spacing the membrane 2722 apart from the substrate 2708 a distance equal to the thickness of the adhesive layer 2724. Optionally, additional layers (not shown) may be included between the membrane 2722 and the substrate 2708. The adhesive layer 2724 defines a respective aperture, exemplified by apertures 2726, 2728 and 2730, for each pixel 2702-2706.

The membrane 2722 is electrically conductive on at least one surface or at least one layer thereof and is electrically grounded. The apertures 2726-2730 register between the respective bumps 2723 and traces 2725 and define respective capacitive gaps between the bumps 2723 and the traces 2725. Each pixel's bump 2723 can be activated by placing opposite electrical charges on the pixel's trace 2725 and on the membrane 2722, thereby electrostatically attracting, and thus translating, the bump 2723 toward the trace 2725. Since the membrane surrounding the bump 2723 is resilient, removing the electric charge causes the bump 2723 to rebound to its original position. The through holes 2716-2720 provide ventilation (pressure-relief), such as when a bump 2723 translates toward, or away from, its corresponding trace 2725.

Integrated circuits may be placed on the back or edges of the substrate 2708 to drive sub-sections of the display. For a small number of pixels (e.g. a few lines of Braille text), the interconnects 2710-2714 can bring all needed connections to the edge of the substrate 2708, such as to respective pixel drive connections, exemplified by pad 2715. Displays with higher densities and/or larger quantities of pixels can include driver ASICs mounted on the substrate 2708 to control groups of pixels 2702-2706, with data fed in through the edges of the substrate 2708. For still higher densities of pixels 2702-2706, row and column addressing can be used.

Although the pixels 2702-2706 shown in FIGS. 27 and 28 each includes a ventilation through hole 2716-2720 defined by the substrate 2708, in other embodiments the membrane 2722 can define the through holes or each pixel cavity can be vented laterally, through the substrate 2708, such as into another chamber. Although one through ventilation hole 2716-2720 is shown for each pixel 2702-2706, each pixel can define more through holes, such as four to seven holes, such as to reduce squeeze film damping.

Conventional cMUTs do not include ventilation through holes, because conventional cMUTs are used at resonant, and typically higher, frequencies, and stiff internal air compliance is required as part of the spring used to restore the membrane. cMUTs according to the present disclosure can operate at lower frequencies and can be non-resonant. Thus, conventional cMUT technology teaches away from ventilating a cMUT, as is done in embodiments of the present invention.

Figure 29:
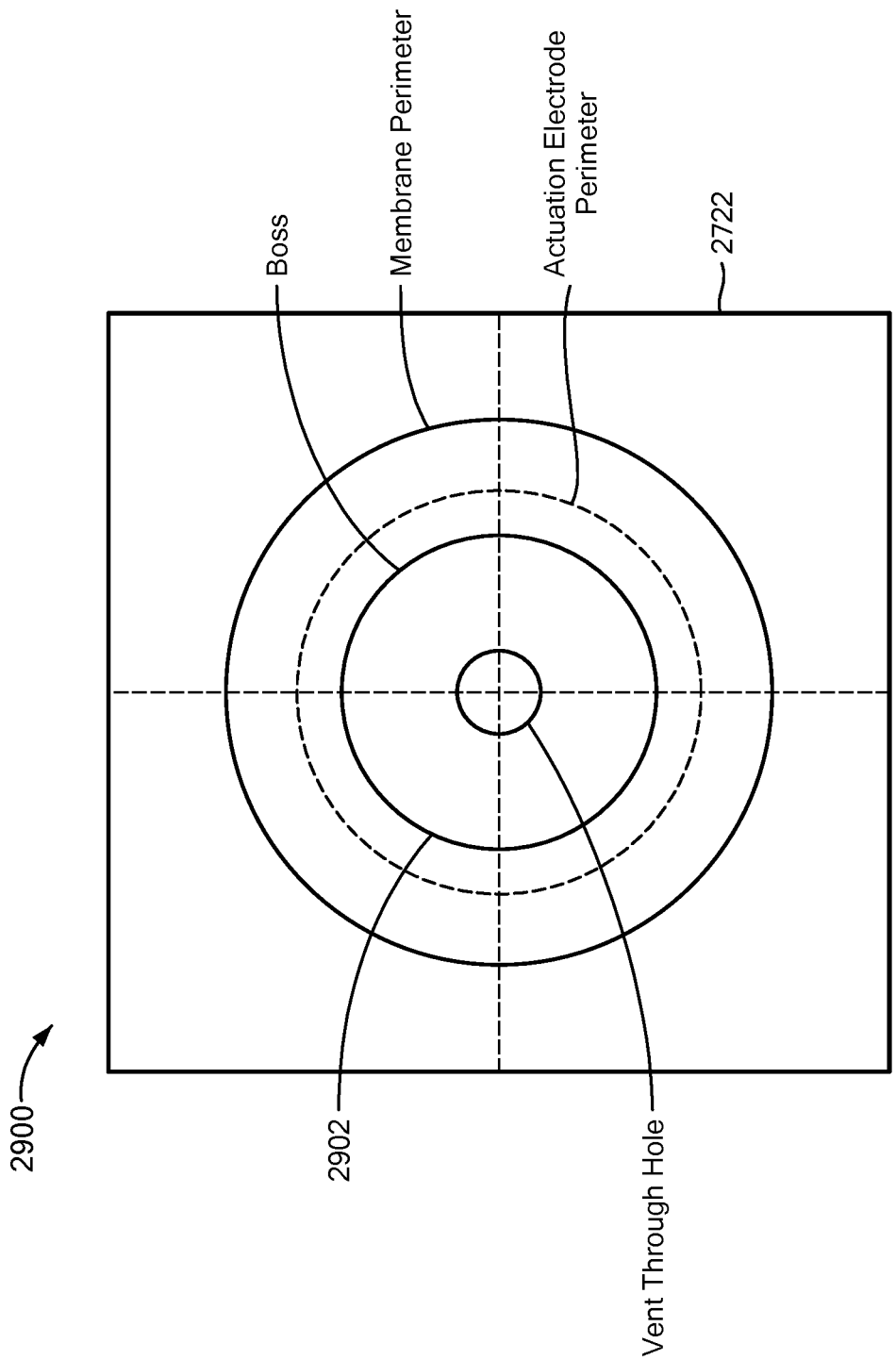
Figure 30:
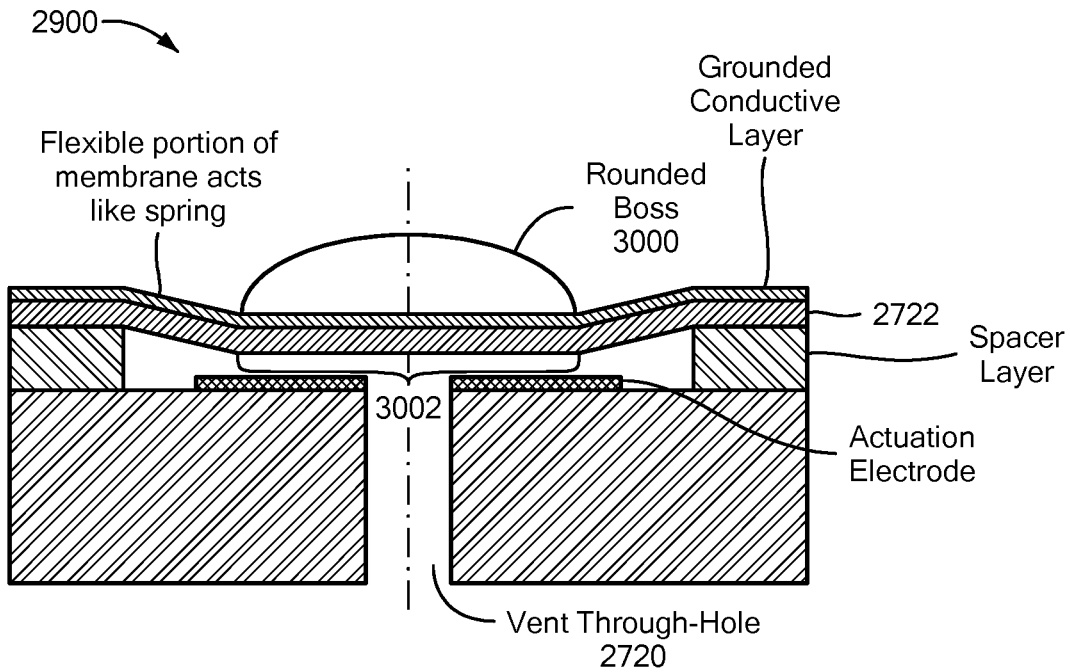
Figure 31:
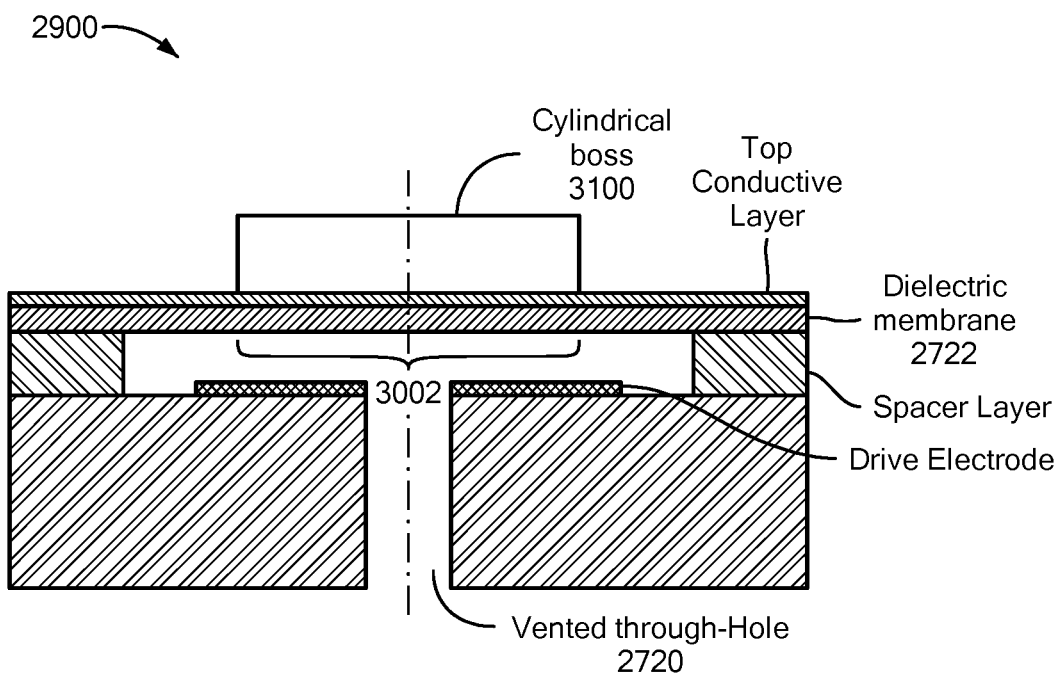

Optionally, each pixel includes a boss, as shown in FIGS. 29, 30 and 31. FIG. 29 is a top (plan) view of a pixel 2900 with a boss 2902. FIG. 30 is a cross-sectional view of the pixel 2900 of FIG. 29, with a rounded boss 3000, and FIG. 31 is a cross-sectional view of the pixel 2900 of FIG. 29, with a cylindrical boss 3100.

When a pixel is in use, the boss 2902, 3000, 3100 is contacted by a fingertip of a user and concentrates force on a small area of the fingertip, thus making movement or vibration of the pixel 2702-2706 more evident to the user. The steady state of the membrane 2722 is in an up position, as shown in FIG. 31. When the pixel is powered, the membrane 2722 is in a down position, as shown in FIG. 30, because the membrane 2722 is resilient, and capacitive forces are attractive. Absent the boss 2902, 3000 or 3100, a user might not sense an activated membrane 2722 being pulled away from the user's finger. However, with a boss 2902, 3000 or 3100, the movement of the membrane 2722 is made more evident to the user.

The boss 2902, 3000 or 3100 creates a stiff region in a center portion 3002 of the pixel membrane 2723, which then moves like a piston, with a more flexible edge region outside the central portion 3002 acting as a spring. This results in a more efficient capacitive actuator. A uniform membrane cMUT transducer, i.e., one without a boss, has a center that moves more than the edges, with the membrane taking on a parabolic shape, which limits the average displacement to less than the full gap.

The boss 2902, 3000, 3100 stiffens the center of the membrane bump 2723 and thereby improves efficiency of the cMUT. The bottom of the boss 2902, 3000 or 3100 is flat and, therefore, the boss 2902, 3000 or 3100 keeps the central portion 3002 of the membrane 2722 flat, regardless the position (up or down) of the membrane 2722, as most clearly shown in FIG. 30. The flat central portion 3002 of the cMUT makes the capacitor move like a plunger with parallel plates, which is more efficient than a membrane deflecting with a parabolic shape, as would be the case absent the boss 2902, 3000 or 3100. Absent the boss 2902, 3000 or 3100, the center of the membrane 2722 moves the furthest and limits motion while electrostatic forces on the outer part of the membrane are less effective.

As noted, for high densities of pixels 2702-2706, row and column addressing can be used. Row and column addressing is used in some liquid crystal displays (LCDs). cMUT pixels may be fabricated on a glass substrate, and a relatively high voltage (apx. 300 V.) may be used to actuate the pixels. A transistor capable of switching such a voltage, such as a suitable thin-film transistor (TFT), is disposed at each row/column intersection. An optional charge storage capacitor may be included in parallel with each pixel.

Row and column addressing facilitates transferring data sequentially, one row at a time. For example, when a scan line is selected, the thin-film transistors in the selected row all turn on, allowing the data from column data lines to pass through the transistors to the respective pixels in that row. When a given column is turned on, each transistor in that column is turned on and data is written into each pixel in the form of charge on the storage capacitor. For the tactile display, each pixel is a capacitor capable of storing charge, although an additional storage capacitor may be added to improve the voltage stability of the pixel to leakage currents through the pixel and the TFT.

The data for the entire array is written sequentially, one row at a time. The refresh rate for the display would be at least twice the highest frequency applied to the pixels. For example, if a 200 Hz square wave is to be written to a set of pixels, a 400 Hz data refresh rate would be sufficient to write the high voltage and low voltage of the square waves.

Figure 20:
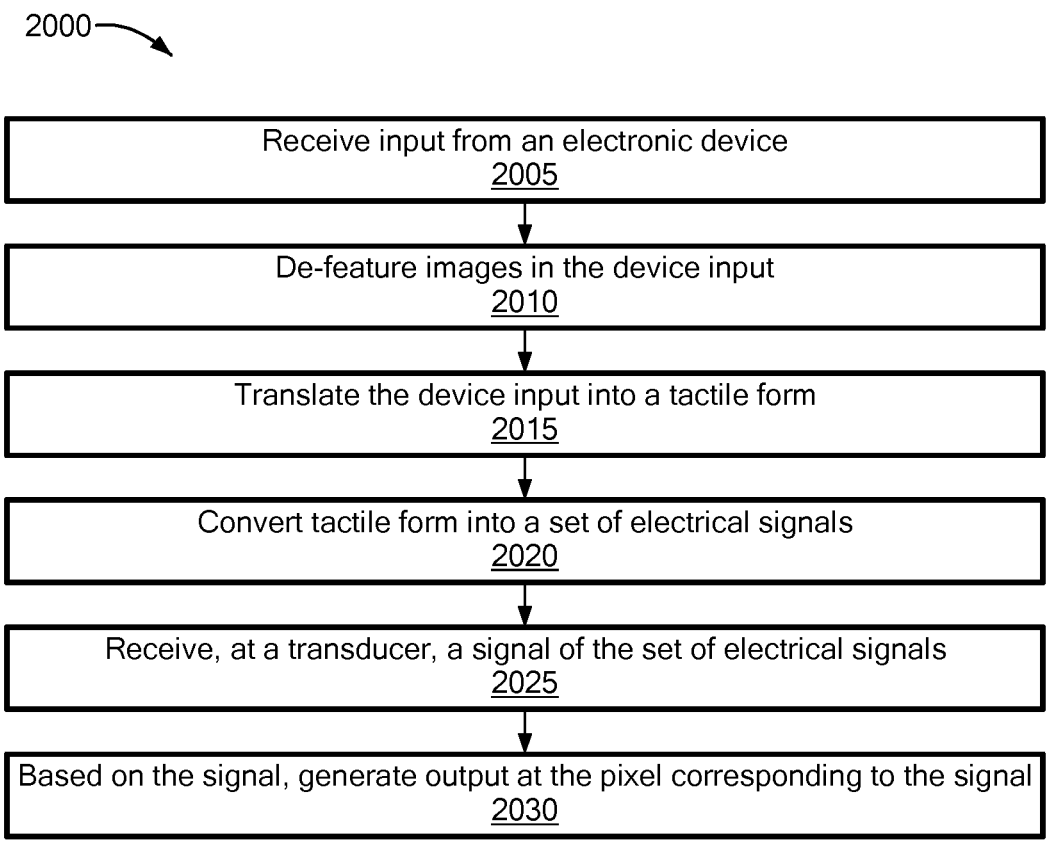
FIG. 20 shows a flowchart of a method for generating tactile output on a tactile display, in accordance with embodiments of the present invention.

FIG. 20 shows a flowchart of a method 2000 for generating tactile output on a tactile display, in accordance with embodiments of the present invention. In embodiments, the method 2000 of FIG. 20 is executed by the system of FIG. 2.

The method 2000 begins at step 2005 by receiving input from an electrical device. The device input may include text and/or images. The device input may be received as a single input or in a continuous, periodic or occasional manner from the electronic device. The device input may be data processed and/or displayed by the computing device, such as content retrieved from the Internet or other communicatively coupled network or device, or content stored on, or generated by, the computing device. The computing device may be a tablet computer, cell phone, laptop, personal computer, e-Reader, etc. In some embodiments, the electronic device may be a device that captures pixelated images, such as a digital camera (e.g., single, binocular, with structured lighting, etc.), a scanner, a LIDAR, etc. For example, the device may be a camera that captures text and images from traditional books or other electronic content. For another example, the device may be a camera or LIDAR that captures the surroundings of the user in 2-dimensions (2D) or 3-dimensions (3D).

The method 2000, at step 2010, next defeatures images in the device input. The method 2000, at step 2010 may locate non-essential object details within objects of the image, such as details less than a certain size or resolution, and remove the non-essential object details, to create an outline of the object. The method 2000, at step 2010, may locate entire objects that are non-essential within the image, and remove the non-essential objects from the image. The method 2000, at step 2010, may also locate objects (e.g., people, cars, animals, etc.) in an image and convert or replace the objects into icons. The method 2000, at step 2010 may also enhance edges of the image (as shown in FIG. 5) and sort and/or order objects within the image by proximity or distance. The method 2000, at step 2010, may apply, without limitation, any other defeaturing functions known in the art to simply the image.

The method 2000, at step 2015, then translates the device input into tactile form. The method 2000, at step 2015, translates text within the device input to the tactile form of Braille. The method 2000, at step 2020, further translates images in the device input to tactile patterns that represent distances, proximity, ranges, colors, etc. of objects within the image. The tactile form is mapped to a set of pixels that are to be used to output the device input to the human user. For example, in embodiments, the method 2000 is executed by a system that is to be positioned over a computing device's screen. In these embodiments, the set of pixels may correspond to the pixels on that computing device's screen. High resolution optical pixels on the device screen may be grouped (downsampled or subsampled) to form larger pixels appropriate to the tactile display. The method 2000 maps the tactile form to the set of pixels in a manner such that tactile features in the tactile form can be output to the user in a resolution that can be sensed by the fingertips of the human user (which can resolve output of approximately 1-1.5 mm or larger).

The method 2000, at step 2020, next converts the tactile form into a set of electrical signals. In some embodiments, the electrical signals are AC signals. Each electrical signal corresponds to a pixel of the set of pixels and codes output to be provided at that pixel. For each image of the device input, the method 2000, step 2020, encodes the tactile patterns into the electrical signals, such as by the frequency of transmitting certain electrical signals, modulating electrical signals at multiple frequencies, modulating electrical signals at multiple amplitudes, double modulation (e.g., 2 Hz×250 Hz), etc. For example, the distance to an object may be coded by frequency of transmitting a signal to pixels corresponding to the object (e.g., frequency higher at pixels closer to the object). For another example, range or color of an object may be coded by modulating the frequency or amplitude of the signal at the corresponding pixels.

The method 2000, at step 2025, next receives, at a transducer, a signal of the set of signals. The transducer may be part of a set of transducers, in which each transducer or a subset of the set of transducers corresponds to a pixel of the set of pixels. The set of transducers may include cMUTs, pMUTs, electromagnetic actuators, etc. The method 2000, at step 2030, based on the received signal, generates output at the pixel corresponding to the signal. For example, if the transducer is a cMUT or electromagnetic actuator, the method 2000, at step 2030, generates vibration output at the pixel at a frequency detectable by the fingertip of the user. For another example, if the transducer is a pMUT, the method 2000, at step 2030, generates vibration or bi-static displacement output at the pixel at a frequency detectable by the fingertip of the user. In some embodiments, the method generates the output at the frequency of maximum sensitivity of the user of about 250 Hz. The generated output from each of the transducers in the transducer array together present tactile features (text and image) that can be sensed by the user.

FIG. 21 shows a tactile display configured as a directional speaker that projects sound to the user's ears, in accordance with an embodiment of the present invention.

The tactile array of pixels, in addition to producing a vibratory excitation, also produces an appropriate acoustic waveform by applying the appropriate voltage to each pixel. It is well known in the field of acoustic beam-steering that by applying time delays to an array of speakers, one can both aim and focus the sound field to a desired target (e.g. the user's ears). In addition, one can arrange nulls in the sound field in any desired direction. The basic principle of beam-steering is to use the time delays (or phase shifts) so that the sound projected from each pixel arrives in phase at the desired target. A linear phase shift causes the projected sound to steer in a desired direction away from the speaker surface normal vector, while a quadratic phase shift creates a focusing effect. As shown in FIG. 21, in this manner, a tactile display can be operated with appropriate time delays to create a directional speaker that projects sound preferentially to the user's ears. The concentric circles in FIG. 21 show regions of constant time delay. In other embodiments, the time delays are configured to project the sound in a desired direction, such as to draw the user's attention in that direction.

By actuating alternating pixels with waveforms that are 180° out of phase, embodiments of the present invention can reduce the acoustic output by 20-40 dB for quiet operation of the tactile display, compared to driving all pixels with the same phase. Such acoustic quieting is important to avoid inconveniencing users and others in close proximity of the tactile display. FIGS. 22-25 show example waveforms produced in embodiments of the present invention to provide such quiet operation of the tactile display.

Figure 22:
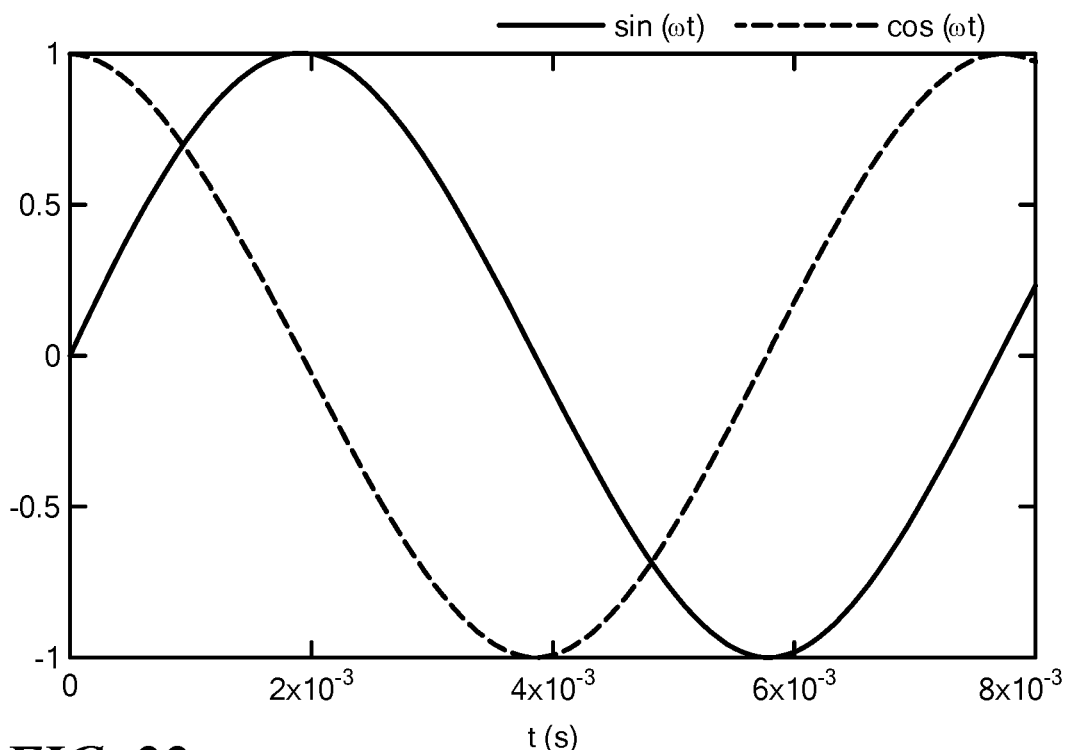
FIGS. 22-25 show example waveforms produced in embodiments of the present invention to provide quiet operation of the tactile display.
Figure 23:
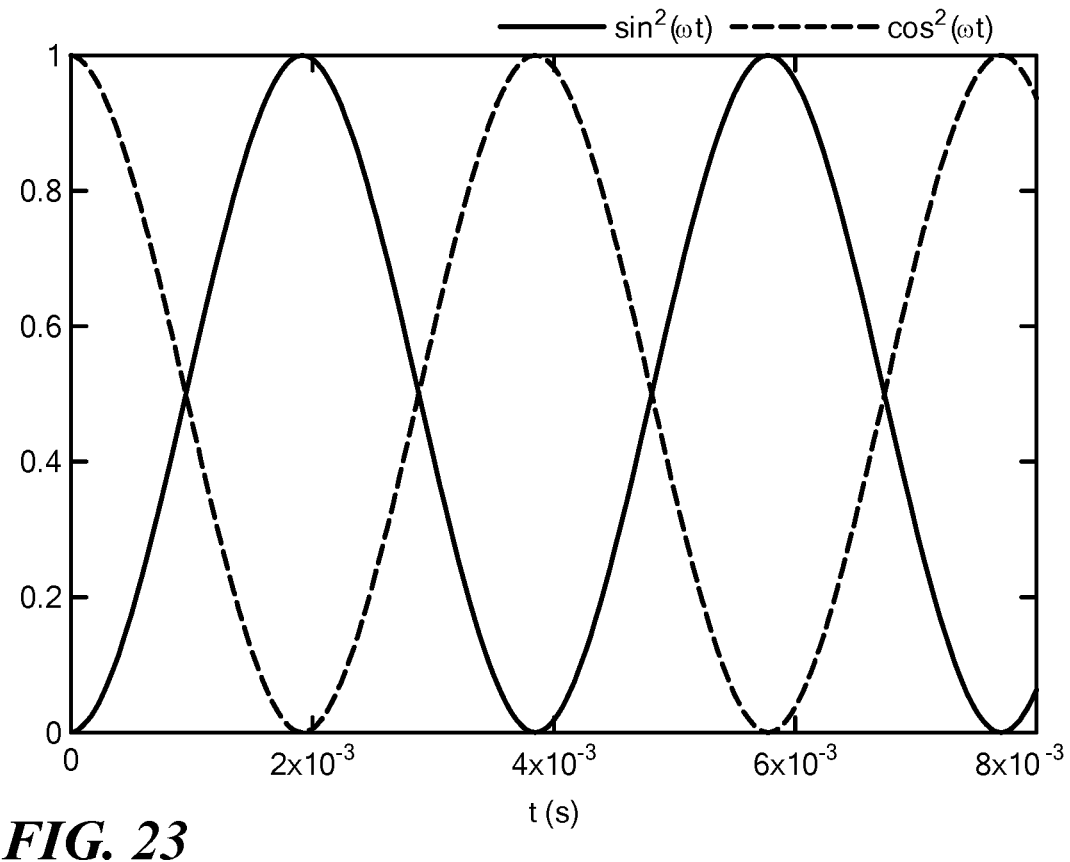

FIGS. 22 and 23 show waveforms of sinusoidal output produced by a square law (e.g., cMUT) transducer/actuator embodiment, in accordance with an embodiment of the present invention. In the embodiment of FIGS. 22 and 23, the cMUT actuator produces an acoustic pressure proportional to the square of the input voltage. For the cMUT actuator to produce a pressure output that is a linear function of the input, either a large DC voltage must be applied, or an input voltage proportional to the square root of the desired pressure waveform must be applied.

To produce a sinusoidal vibration at frequency $f_0$ (e.g., 260 Hz) using the cMUT actuator without a DC bias voltage, embodiments input a sinusoidal voltage (sin and cos voltage inputs) at half that frequency, $f_0/2$ (e.g., 130 Hz). These embodiments introduce two out-of-phase waveforms, as shown in FIG. 22 and as defined by equations (1) and (2):

$$\text{Waveform A(half frequency)}: V = V_0 \sin(\pi f_0 t) \quad (1)$$

$$\text{Waveform B(half frequency)}: V = V_0 \cos(\pi f_0 t) \quad (2)$$

As shown in FIG. 23, the output acoustic energy $Rad_A$ from pixels actuated with waveform A is proportional to:

$$Rad_A \propto V_0^2 \sin^2(\pi f_0 t) = V_0^2 \frac{1}{2}(1 - \cos(2\pi f_0 t)).$$

The acoustic energy $Rad_B$ radiated from pixels actuated with waveform B is proportional to:

$$Rad_B \propto V_0^2 \cos^2(\pi f_0 t) = V_0^2 \frac{1}{2}(1 + \cos(2\pi f_0 t)).$$

Note that these figures use the standard notation:

$$\omega = 2\pi f.$$

As shown in FIG. 23, the AC portion at $f_0$ from the two pixels is equal and opposite, and will cancel each other resulting in greatly reduced radiated sound. That is, the output pressure proportional to squared sin and cos waveforms add to 1, or no net acoustic radiated power. This can also be shown by the well-known identity from trigonometry, $\sin^2\theta + \cos^2\theta = 1$.

Figure 24:
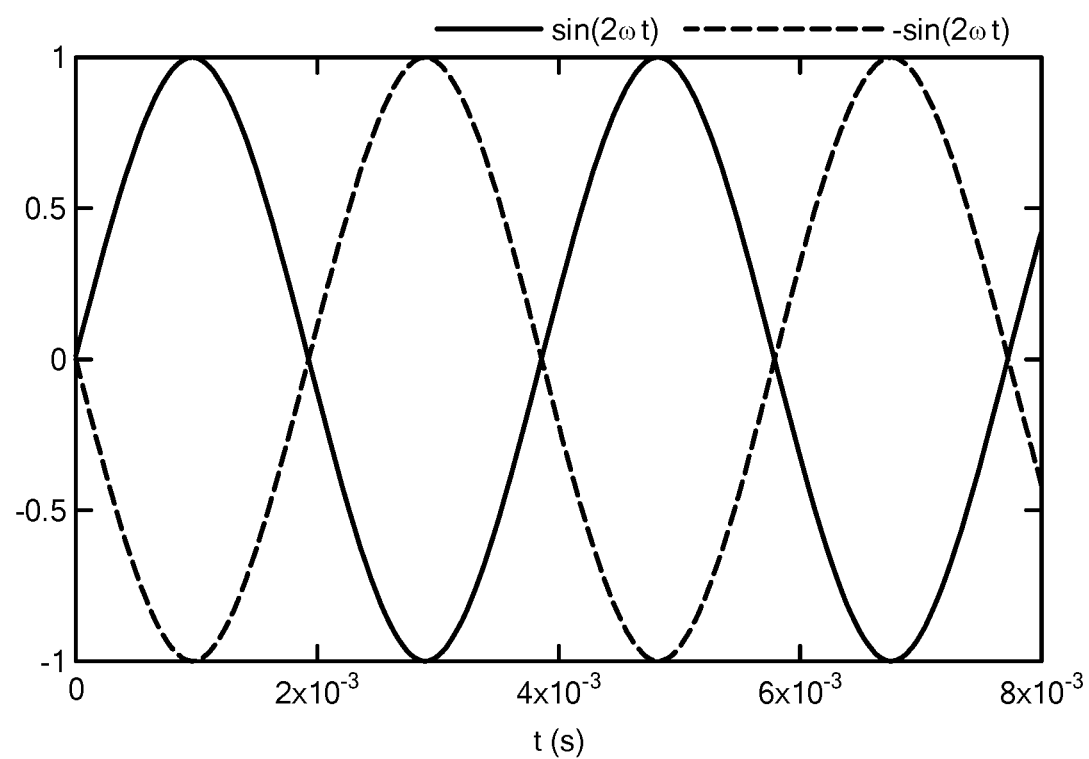

FIG. 24 shows a sinusoidal example using linear actuator, in accordance with embodiments of the present invention, for quiet operation of a tactile display. For the linear actuator of FIG. 24, actuation voltages proportional to the desired output pressures are used. For such linear actuator, e.g., a magnetic coil, a cMUT with an electret, or piezoelectric actuator, there is no square law as in a zero-bias cMUT actuator. For these actuators, embodiments use equal and opposite drive voltages. As shown in FIG. 24, equal and opposite voltage waveforms are applied to alternate pixels with a linear actuator (e.g., piezoelectric, piezo-electret, moving coil, or moving magnet) to operate in silent mode (quiet operation).

Figure 25:
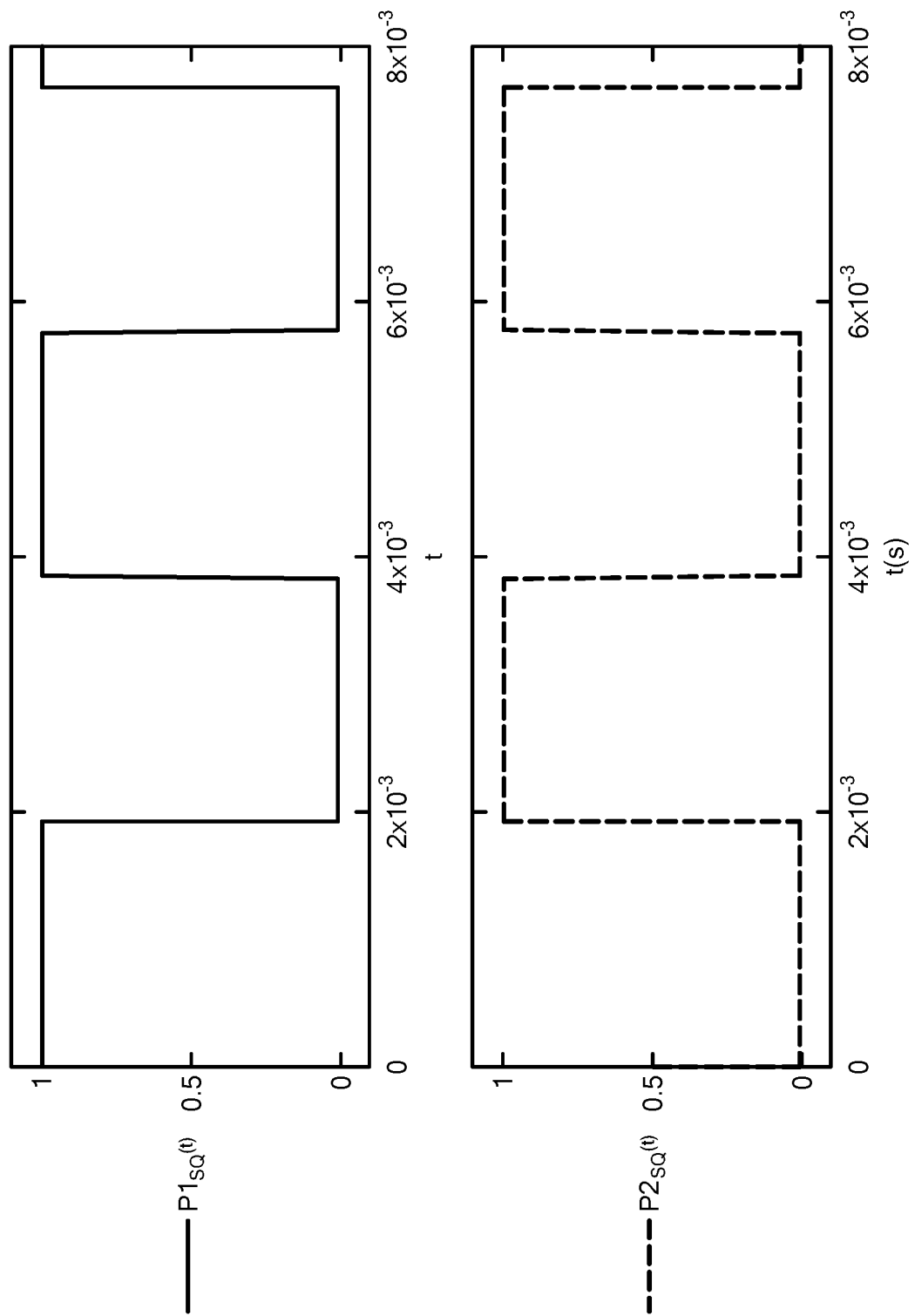

FIG. 25 shows a square waveform example (linear or square law actuator pixels), in accordance with embodiments of the present invention, for quiet operation of a tactile display. Instead of driving the pixels with sinusoidal waveforms, it may be desirable to use square waves, as shown in FIG. 25. Square-waves are easier to generate from digital electronics with high efficiency. In general, a square-wave-driven waveform may vary from zero volts to some maximum level $V_A$, or it may have zero-mean, ranging from $+V_A$ to $-V_A$. Either type of square wave waveform can be used to drive a linear transducer. However, in the case of a square law transducer, such as a cMUT without an electret or bias voltage, the zero-mean square-waveform would not be used since the force from $+V_A$ and $-V_A$ is the same in magnitude and direction. In the embodiment of FIG. 25, a pair of equal and opposite square-waves $P1_{SQ}(t)$ and $P2_{SQ}(t)$ waveforms produced at 260 Hz.

Figure 26:
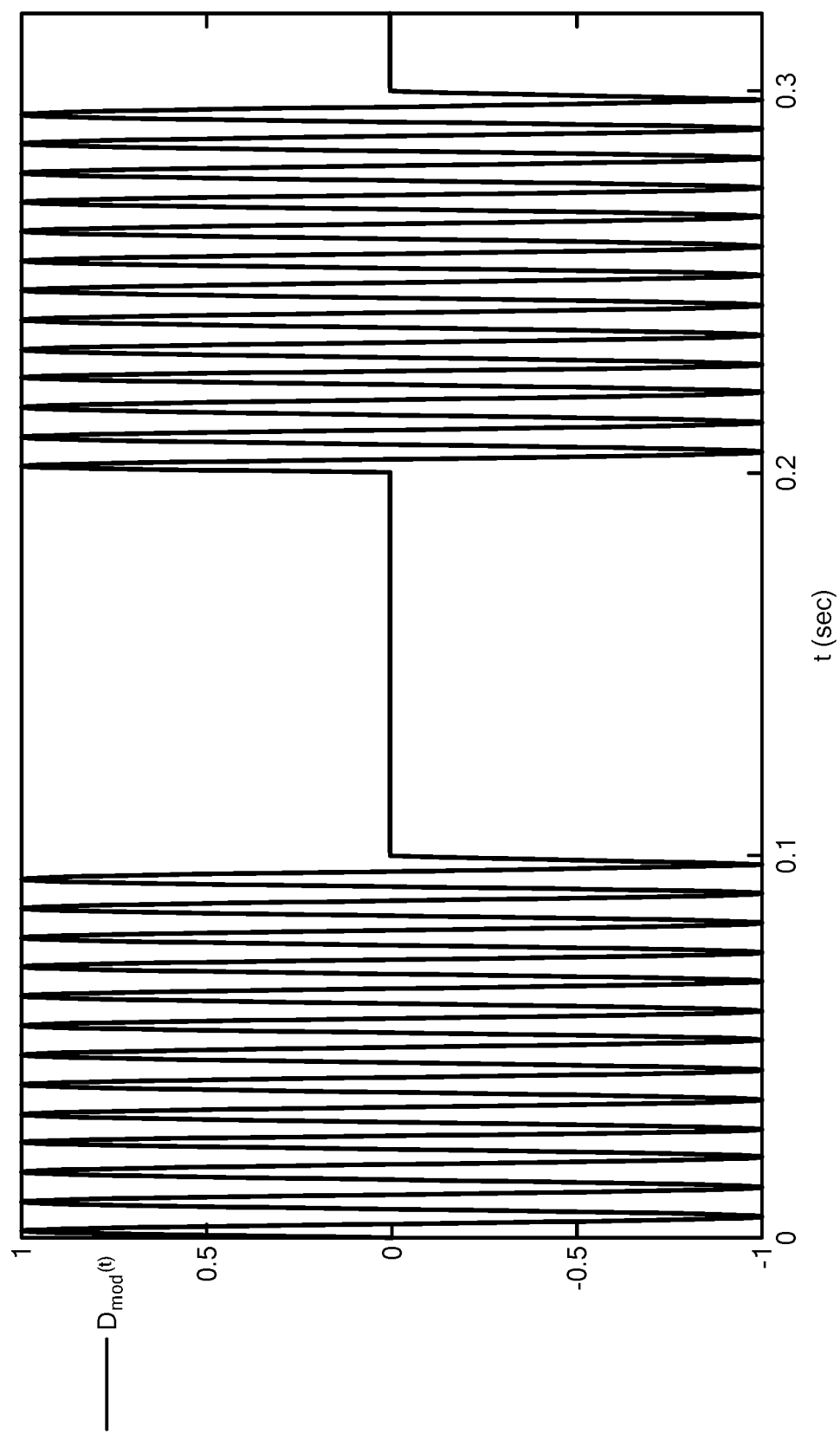
FIG. 26 shows an example double modulated waveform, in accordance with an embodiment of the present invention, for representation of variables in an image.

FIG. 26 shows an example double modulated waveform, in accordance with an embodiment of the present invention, for representation of variables in an image. The finger has maximum sensitivity to vibrations between 200 and 300 Hz. In this frequency range, the fingertip can sense motions on the order of 1 to 10 um. Embodiments, such the embodiment of FIG. 26, create distinguishable tactile signals by applying a secondary modulation on this fundamental frequency at a lower frequency, e.g. in the range from 0.5 to 10 Hz, and preferably in the range 1 to 5 Hz which can be distinguished by a human finger.

In the doubled modulated waveform of FIG. 26, both the primary (higher frequency) waveform and the secondary modulation waveform may be selected from a square wave, sinewave, triangle wave, or chirped (variable frequency) waveform. In the embodiment of FIG. 26, the waveforms are driven with double modulation at 130 Hz (sinewave) and 5 Hz (square-wave). Changing the frequency or waveform of the slow modulation in the range 1-10 Hz creates a variable tactile sensation which can be used to represent color, distance or other variables in an image.

Fingertips are extremely sensitive to motion of vibration, i.e. shifts in the position of the apparent vibration. By appropriately programming the vibratory display, in embodiments, lines or other patterns of vibration can be moved under a stationary finger, creating the sensation of motion. Such movement could be useful in embodiments to indicate direction, simulate textures, or draw attention to important features of an image.

While the invention is described through the above-described exemplary embodiments, modifications to, and variations of, the illustrated embodiments may be made without departing from the inventive concepts disclosed herein. For example, although specific parameter values, such as capacitance level, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Although aspects of embodiments may be described with reference to flowcharts and/or block diagrams, functions, operations, decisions, etc. of all or a portion of each block, or a combination of blocks, may be combined, separated into separate operations or performed in other orders. References to a "module" or "step" are for convenience and not intended to limit its implementation. All or a portion of each block, module or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

The micro-processor of FIG. 2, or portions thereof, may be implemented by one or more processors executing, or controlled by, instructions stored in a memory. Each processor may be a general purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

As used herein, numerical terms, such as "first," "second" and "third," are used to distinguish respective system layers from one another and are not intended to necessarily indicate any particular order or total number of layers in any particular embodiment. Thus, for example, a given embodiment may include only a first layer and a third layer.

What is claimed is:

1. A tactile human-user interface system, the system comprising:
    an interface including a cover sheet configured to receive input from an electronic device, the input includes text and/or at least one image comprising objects;
    an image defeature filter configured to:
        defeature each image of the at least one image, wherein to defeature each image, the image defeature filter is configured to:
            determine that at least one object of the objects is unessential and
            remove the at least one unessential object from the at least one image
        to produce a simplified form of each of the at least one image of the input; a conversion engine configured to:
            responsive to defeaturing the at least one image, translate the input into a tactile form, and
            convert the tactile form into a set of electrical signals, such that the set of electrical signals is associated with a set of pixels; and
    a set of transducers arranged below the cover sheet of the interface, each transducer or a subset of the set of transducers corresponding to a respective pixel of the set of pixels, and the set of transducers is configured to:
        receive, from the conversion engine, the set of electrical signals, and
        generate, in response to the set of electrical signals, outputs detectable by a finger of a human user at the cover sheet, at locations corresponding to the respective pixel of the set of pixels, wherein alternating pixels in the set of pixels are configured to be actuated with waveforms that are 180° out of phase, so as to reduce the outputs by 20-40 dB for quiet operation of the system, compared to actuating each of the set of pixels with the same phase.

2. The system according to claim 1, wherein the system comprises a micro-electro-mechanical system (MEMS).

3. The system according to claim 1, wherein the electronic device comprises a computing device that provides the input from data retrieved and/or displayed by the computing device, the computing device including a tablet, mobile phone, laptop computer, or personal computer.

4. The system according to claim 1, wherein the electronic device comprises a device that captures the input from surroundings of the user, including a camera, a scanner, or a LIDAR.

5. The system according to claim 1, wherein the image defeature filter is configured to defeature an image in the input by (i) enhancing edges of the image, (ii) converting objects in the image to iconic form, (iii) sorting objects in the image by proximity or range, and/or (iv) removing details from objects in the image to create an outline of the objects.

6. The system according to claim 1, wherein the tactile form comprises Braille or a tactile pattern.

7. The system according to claim 6, wherein for the image, the conversion engine is configured to code the tactile pattern into the set of electrical signals by modulating at multiple frequencies, modulating at multiple amplitudes, or double modulation.

8. The system according to claim 7, wherein the electrical signals represent (i) distance, (ii) proximity, and/or (iii) color.

9. The system according to claim 1, wherein the outputs are vibration, pressure, or bi-static displacement.

10. The system according to claim 1, wherein the outputs have a frequency of about 250 Hz.

11. The system according to claim 1, wherein an audio circuit coupled to the conversion engine is configured to generate the speech output corresponding to the outputs.

12. The system according to claim 1, wherein the set of transducers function as a directional speaker that projects generated speech output to ears of the user.

13. The system according to claim 1, wherein the outputs are configured to provide a tactile navigation display to the human user.

14. The system according to claim 1, wherein the set of transducers comprises an array of capacitive micro-machined transducers (cMUTs), such that each cMUT or a sub-array of the array of cMUTs corresponds to a respective pixel of the set of pixels.

15. The system according to claim 14, wherein each cMUT includes an electret layer, which is configured either: (i) over a bottom conductive electrode of the cMUT, (ii) as part of a membrane layer of the cMUT, or (iii) as a porous layer between the bottom conductive electrode and a top conductive electrode of the cMUT.

16. The system according to claim 14, wherein each cMUT defines a ventilation through hole.

17. The system according to claim 14, wherein each cMUT comprises a boss.

18. The system according to claim 1, wherein:
each transducer is configured to detect a capacitance level at a corresponding pixel of the set of pixels, the capacitance level being caused by the finger of the human user touching a location corresponding to the pixel; and the system further comprises:
a differential capacitance readout circuit is configured to compare the capacitance level at the pixel with (i) capacitance levels at adjacent pixels or (ii) a threshold value, and determine input provided by the human user at the pixel.

19. The system according to claim 18, wherein a transducer is further configured to activate the outputs at the respective pixel of the set of pixels, in response to the detected capacitance level at the pixel.

20. The system according to claim 1, wherein the set of transducers comprises an array of electromagnetic actuators, such that each electromagnetic actuator or a sub-array of the array of actuators corresponds to the respective pixel of the set of pixels.

21. The system according to claim 20, wherein:
the array of electromagnetic actuators are positioned above a magnetic material formed to concentrate flux and/or achieve bi-stability, and
each electromagnetic actuator includes: (i) a permanent magnet and (ii) a coil, such that an electrical signal drives each electromagnetic actuator by causing the permanent magnet and/or the coil to vibrate.

22. The system according to claim 21, wherein the array of electromagnetic actuators has a pressure switch configured to detect pressure by the finger of the user at a pixel of the set of pixels, and in response, activate the outputs at a location corresponding to the pixel.

23. The system according to claim 1, wherein the set of transducers comprises an array of piezoelectric micro-machined transducers (pMUTs), such that each pMUT or a sub-array of the array of pMUTs corresponds a respective pixel of the set of pixels.

24. The system according to claim 1, wherein the set of transducers is formed into a thin device layer that fits over a screen of a computing device, including a cell phone, tablet, laptop, or personal computer.

25. The system according to claim 1, wherein the set of transducers is configured as part of a glove worn by the human user.

26. A tactile human-user interface system, the system comprising:
an interface including a cover sheet configured to receive images from a processor;
an image defeature filter configured to defeature the images to produce a simplified form of the images;
a conversion engine configured to:
translate the input into a tactile form, and
convert the tactile form into a set of electrical signals associates with a set of pixels; and
a set of transducers arranged below the cover sheet of the interface, each of the transducers corresponding to a respective one of the set of pixels, the set of transducers is configured to:
receive, from the conversion engine, the set of electrical signals,
generate, in response to the set of electrical signals, outputs detectable by a finger of a human user at the cover sheet, at locations corresponding to the respective pixel of the set of pixels, wherein alternating pixels in the set of pixels are configured to be actuated with waveforms that are 180° out of phase, so as to reduce the outputs by 20-40 dB for quiet operation of the system, compared to actuating each of the set of pixels with the same phase, and
project sound signals corresponding to the generated outputs.

27. A tactile human-user interface system, the system comprising:
an interface including a cover sheet configured to receive input from an electronic device, the input includes text and/or at least one image comprising objects;
an image defeature filter configured to:
defeature each image of the at least one image, wherein to defeature each image, the image defeature filter is configured to:
determine that at least one object of the objects is unessential and
remove the at least one unessential object from the at least one image
to produce a simplified form of each of the at least one image of the input; a conversion engine configured to:
responsive to defeaturing the at least one image, translate the input into a tactile form, and
convert the tactile form into a set of electrical signals, such that the set of electrical signals is associated with a set of pixels; and
a set of transducers arranged below the cover sheet of the interface, each transducer or a subset of the set of transducers corresponding to a respective pixel of the set of pixels, wherein the set of transducers function as a directional speaker that projects generated speech output to ears of the user and the set of transducers is configured to:
receive, from the conversion engine, the set of electrical signals, and
generate, in response to the set of electrical signals, outputs detectable by a finger of a human user at the cover sheet, at locations corresponding to the respective pixel of the set of pixels.

* * * * *